United States Patent
Jukes (12)

(10) Patent No.: US 10,240,559 B2
(45) Date of Patent: Mar. 26, 2019

(54) PISTON ARRANGEMENT AND INTERNAL COMBUSTION ENGINE

(71) Applicant: Oxford Two Stroke Limited, Oxford, Oxfordshire (GB)

(72) Inventor: Oliver Jukes, Oxfordshire (GB)

(73) Assignee: Joost Engines Ltd., Oxfordshire (GB)

( * ) Notice: Subject to any disclaimer, the term of this patent is extended or adjusted under 35 U.S.C. 154(b) by 57 days.

(21) Appl. No.: 15/414,999

(22) Filed: Jan. 25, 2017

(65) Prior Publication Data

US 2017/0138299 A1    May 18, 2017

Related U.S. Application Data

(63) Continuation of application No. 14/406,164, filed as application No. PCT/GB2013/051677 on Jun. 25, 2013, now Pat. No. 9,611,805.

(30) Foreign Application Priority Data

Jun. 28, 2012 (GB) .................................. 1211490.6

(51) Int. Cl.
    *F04B 17/00*    (2006.01)
    *F02F 3/28*    (2006.01)
    (Continued)

(52) U.S. Cl.
    CPC .................. *F02F 3/28* (2013.01); *F01B 7/16* (2013.01); *F01B 9/023* (2013.01); *F02B 75/02* (2013.01);
    (Continued)

(58) Field of Classification Search
    CPC .... F02F 3/28; F01B 7/16; F01B 9/023; F02B 75/02; F02B 75/32; F02B 2075/025;
    (Continued)

(56) References Cited

U.S. PATENT DOCUMENTS 3,806,284 A    4/1974 Jacobs
3,810,634 A    5/1974 Hakansson
(Continued)

FOREIGN PATENT DOCUMENTS

CN    86210915 U    10/1987
CN    2076608 U    5/1991
(Continued)

OTHER PUBLICATIONS

Nov. 7, 2012 Combined Search and Examination Report from UK Intellectual Property Office in connection with GB1211490.6.
(Continued)

*Primary Examiner* — Marguerite J McMahon
(74) *Attorney, Agent, or Firm* — Hahn Loeser & Parks LLP

(57) ABSTRACT

A piston arrangement comprising: a piston, a first chamber, a second chamber and a power transfer assembly; wherein the piston comprises a first head movable within the first chamber and a second head movable within the second chamber; wherein, in operation, the piston follows a linear path in reciprocating motion along a first axis; wherein the power transfer assembly comprises a shaft rotatably coupled to a shuttle bearing and arranged to convert the reciprocating motion of the piston to rotary motion of the shaft; wherein the shuttle bearing moves relative to the piston in reciprocating motion along a second axis substantially transverse to the first axis; and wherein the shuttle bearing is coupled to the piston via a non-planar bearing surface thereby allowing rotation of the shuttle bearing.

29 Claims, 17 Drawing Sheets

(51) Int. Cl.
  *F01B 7/16* (2006.01)
  *F01B 9/02* (2006.01)
  *F02B 75/32* (2006.01)
  *F16J 1/10* (2006.01)
  *F02B 75/02* (2006.01)
  *F02M 35/10* (2006.01)
  *F16C 31/02* (2006.01)

(52) U.S. Cl.
  CPC ....... *F02B 75/32* (2013.01); *F02M 35/10157* (2013.01); *F16C 31/02* (2013.01); *F16J 1/10* (2013.01); *F02B 2075/025* (2013.01); *F02B 2075/027* (2013.01); *F16C 2360/22* (2013.01); *Y02T 10/144* (2013.01)

(58) Field of Classification Search
  CPC ......... F02B 2075/027; F02M 35/10157; F16C 31/02; F16C 360/22; F16J 1/10; Y02T 10/144
  USPC ................ 123/55.5, 55.7, 197, 197.2–197.4
  See application file for complete search history.

(56) References Cited

U.S. PATENT DOCUMENTS

| | | | |
|---|---|---|---|
| 4,344,742 A * | 8/1982 | Ferris | F02B 63/06 123/197.3 |
| 4,442,758 A | 4/1984 | Groll | |
| 4,791,898 A | 12/1988 | Jayne | |
| 4,800,853 A | 1/1989 | Kraus et al. | |
| 4,850,313 A | 7/1989 | Gibbons | |
| 4,915,019 A | 4/1990 | Hovaguimian | |
| 5,113,808 A | 5/1992 | Eickmann | |
| 5,259,256 A * | 11/1993 | Brackett | F01B 9/023 123/55.3 |
| 5,375,566 A | 12/1994 | Brackett | |
| 5,503,038 A * | 4/1996 | Aquino | F01B 9/06 123/197.1 |
| 5,503,308 A | 4/1996 | Aquino | |
| 5,528,946 A | 6/1996 | Yadegar | |
| 5,692,758 A | 12/1997 | Wikstrom | |
| 5,788,246 A | 8/1998 | Kuribayashi et al. | |
| 5,884,590 A * | 3/1999 | Minculescu | F02B 33/10 123/53.3 |
| 5,934,229 A | 8/1999 | Li et al. | |
| 6,213,064 B1 * | 4/2001 | Geung | F01B 9/026 123/54.1 |
| 9,611,805 B2 * | 4/2017 | Jukes | F01B 7/16 |
| 2004/0227301 A1 | 11/2004 | Wood et al. | |
| 2004/0255879 A1 | 12/2004 | Zaytsev | |
| 2004/0261750 A1 | 12/2004 | McKeown | |
| 2005/0175480 A1 | 8/2005 | Gao et al. | |
| 2005/0224025 A1 | 10/2005 | Sanderson | |
| 2007/0125323 A1 | 6/2007 | Hofbauer | |
| 2008/0289488 A1 | 11/2008 | Raffaele et al. | |
| 2010/0054909 A1 | 3/2010 | Nishiyama et al. | |
| 2012/0234297 A1 | 9/2012 | McAlister et al. | |
| 2013/0008406 A1 | 1/2013 | Hofbauer | |

FOREIGN PATENT DOCUMENTS

| | | |
|---|---|---|
| CN | 1058827 A | 2/1992 |
| CN | 1445463 A | 10/2003 |
| DE | 3628214 A1 | 2/1987 |
| DE | 3624753 A1 | 10/1987 |
| EP | 2535540 A1 | 12/2012 |
| FR | 1155834 | 5/1958 |
| FR | 2456842 | 12/1980 |
| FR | 2540941 A1 | 8/1984 |
| FR | 2850439 A1 | 7/2004 |
| FR | 2927137 A1 | 8/2009 |
| GB | 2038937 A | 7/1980 |
| GB | 2183731 A | 6/1987 |
| GB | 2402707 A | 12/2004 |
| JP | S55 163401 | 11/1980 |
| RU | 2137963 C1 | 9/1999 |
| WO | WO 00/60216 | 10/2000 |
| WO | 2002027143 A1 | 4/2002 |
| WO | 2008048133 A1 | 4/2008 |
| WO | WO 2012/022980 A1 | 2/2012 |
| WO | 2012117427 A1 | 9/2012 |
| WO | 2012159817 A1 | 11/2012 |

OTHER PUBLICATIONS

Dec. 31, 2014 International Preliminary Report on Patentability for PCT/IB2013/051677.

Jul. 14, 2016 Office Action in connection with U.S. Appl. No. 14/406,164.

Aug. 2, 2016 Office Action in connection with application CN 201380033846.9 (16 pages).

Mar. 21, 2018 Official Communication in connection with EP 13 733 424.9.

\* cited by examiner

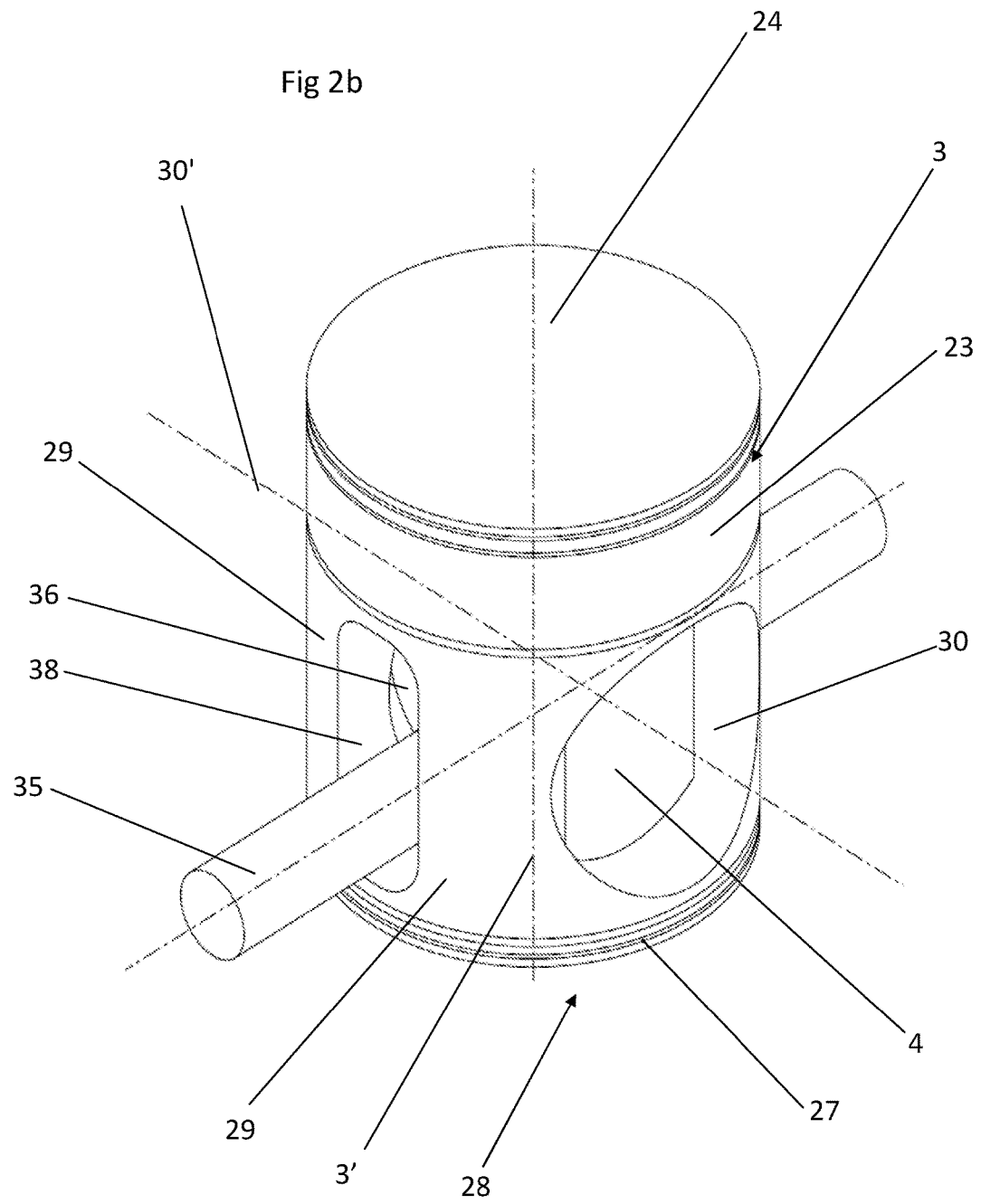

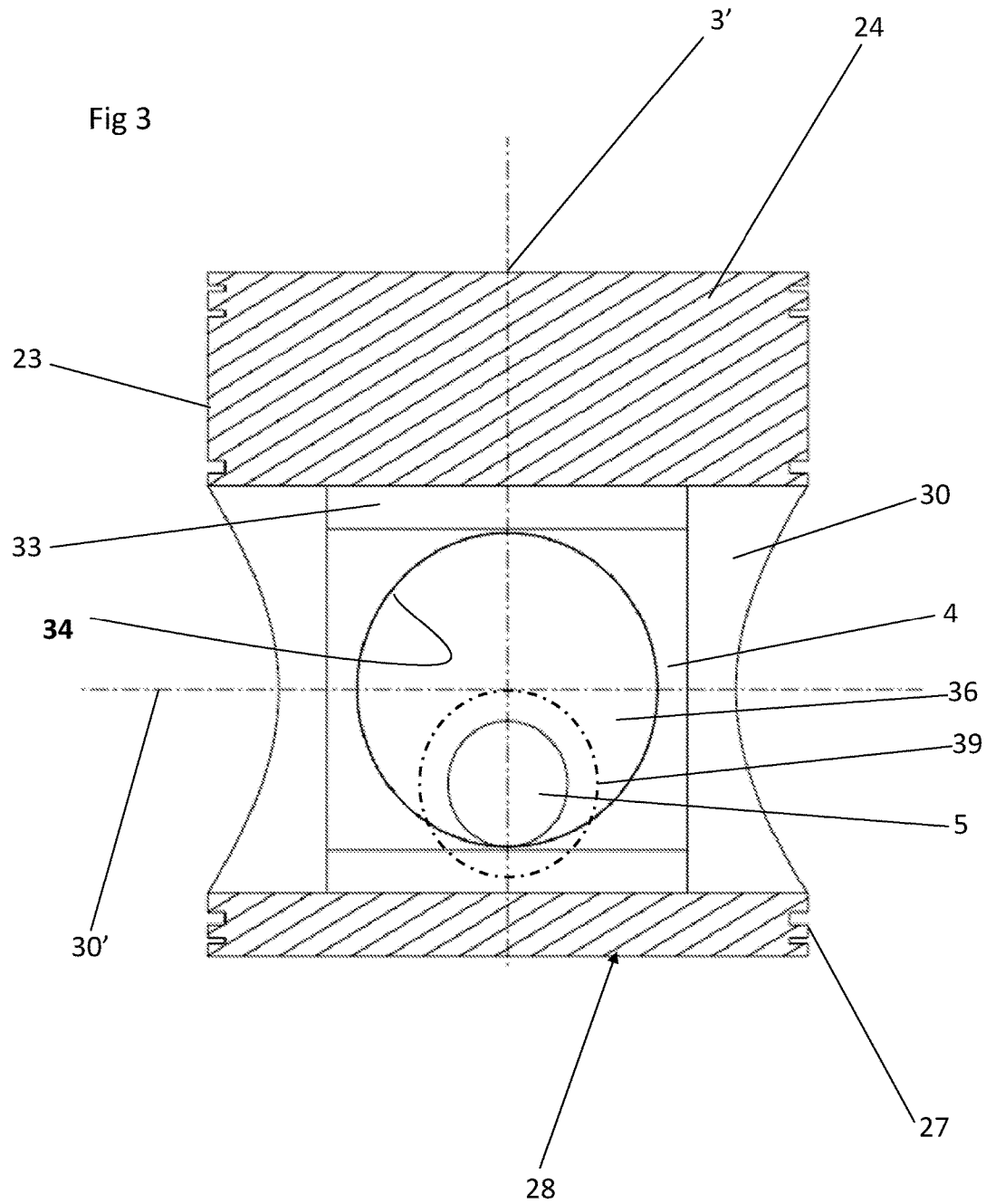

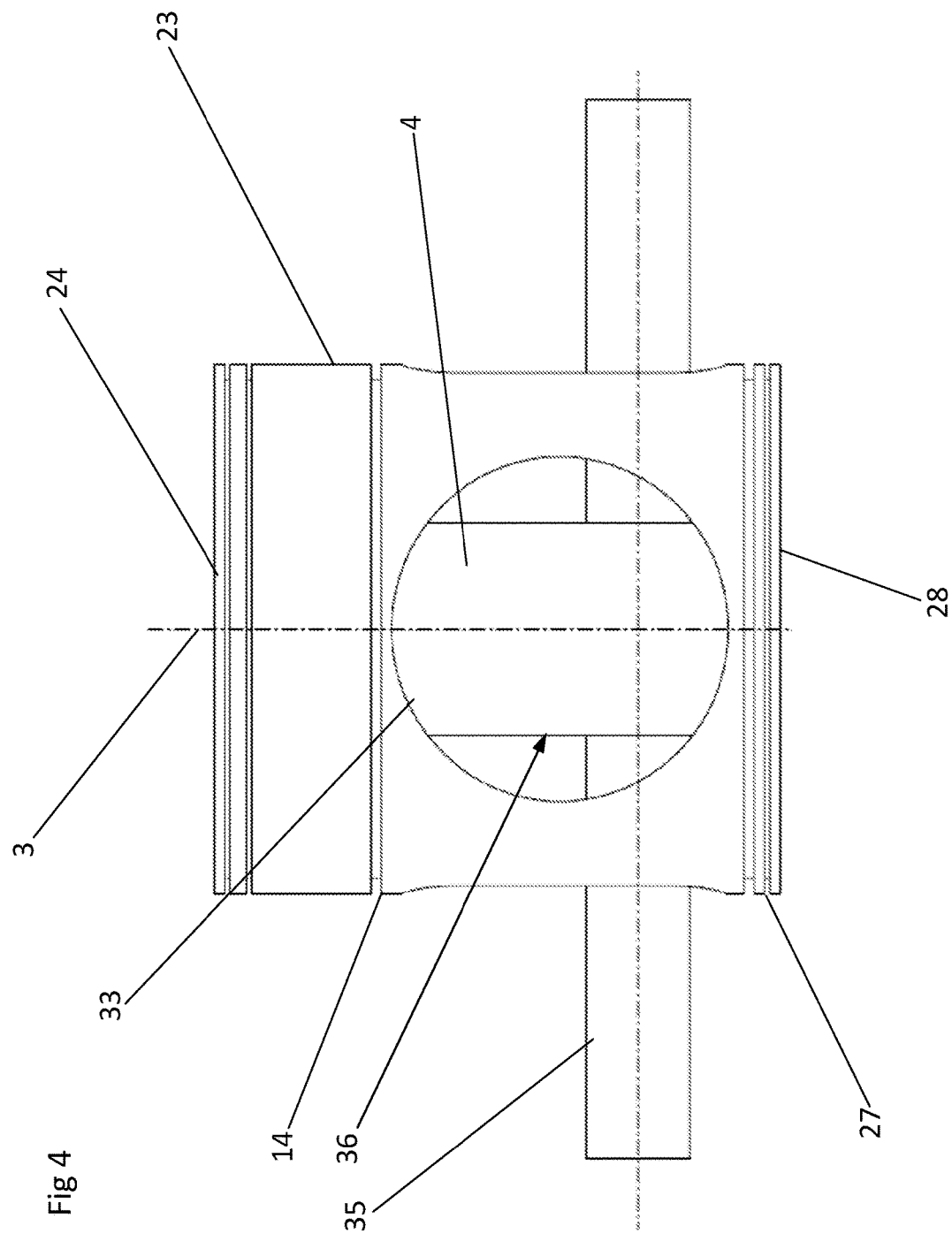

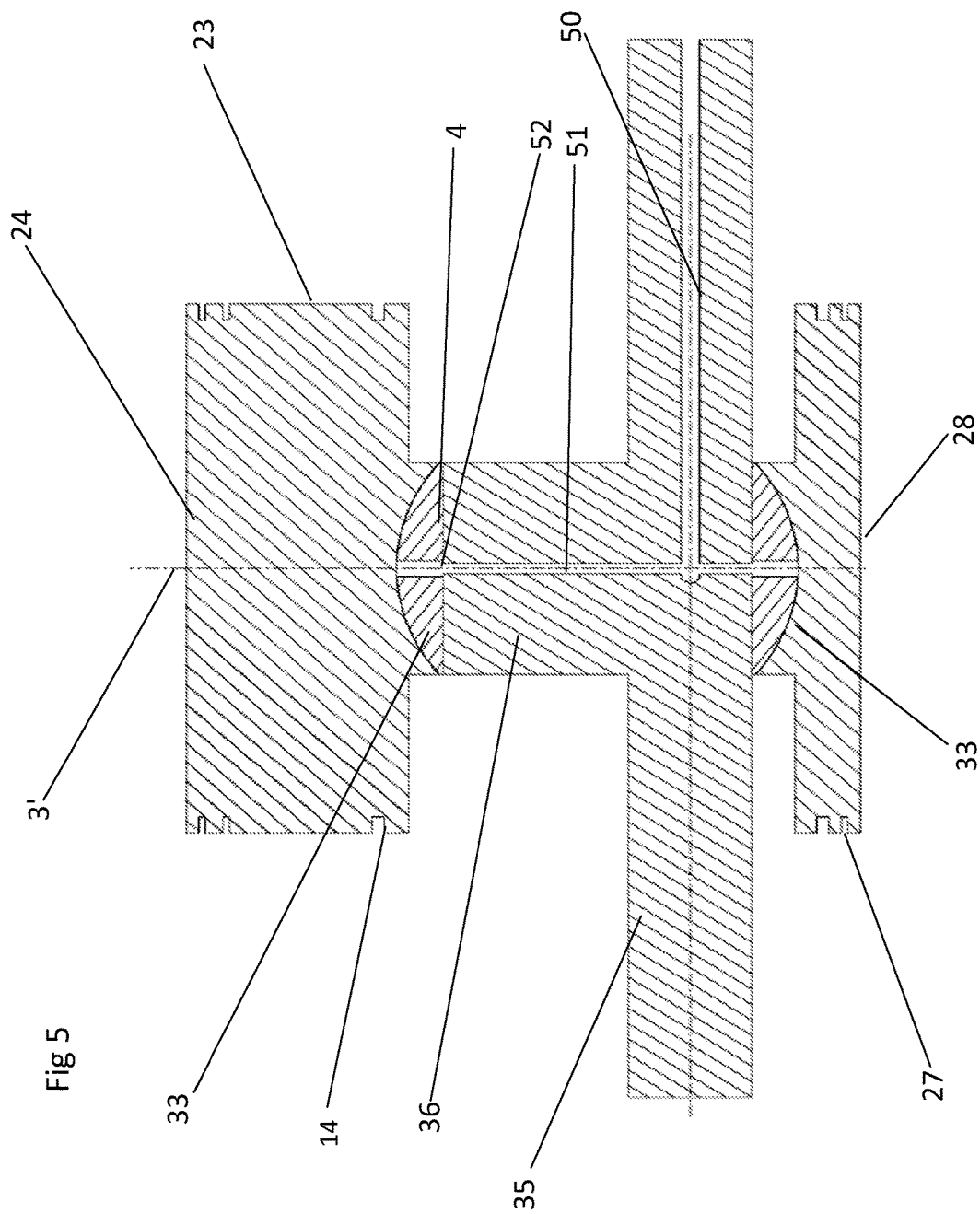

------- Crankshaft and conrod
———— Piston arrangement of fig 1
—·—·— Piston arrangement of fig 9

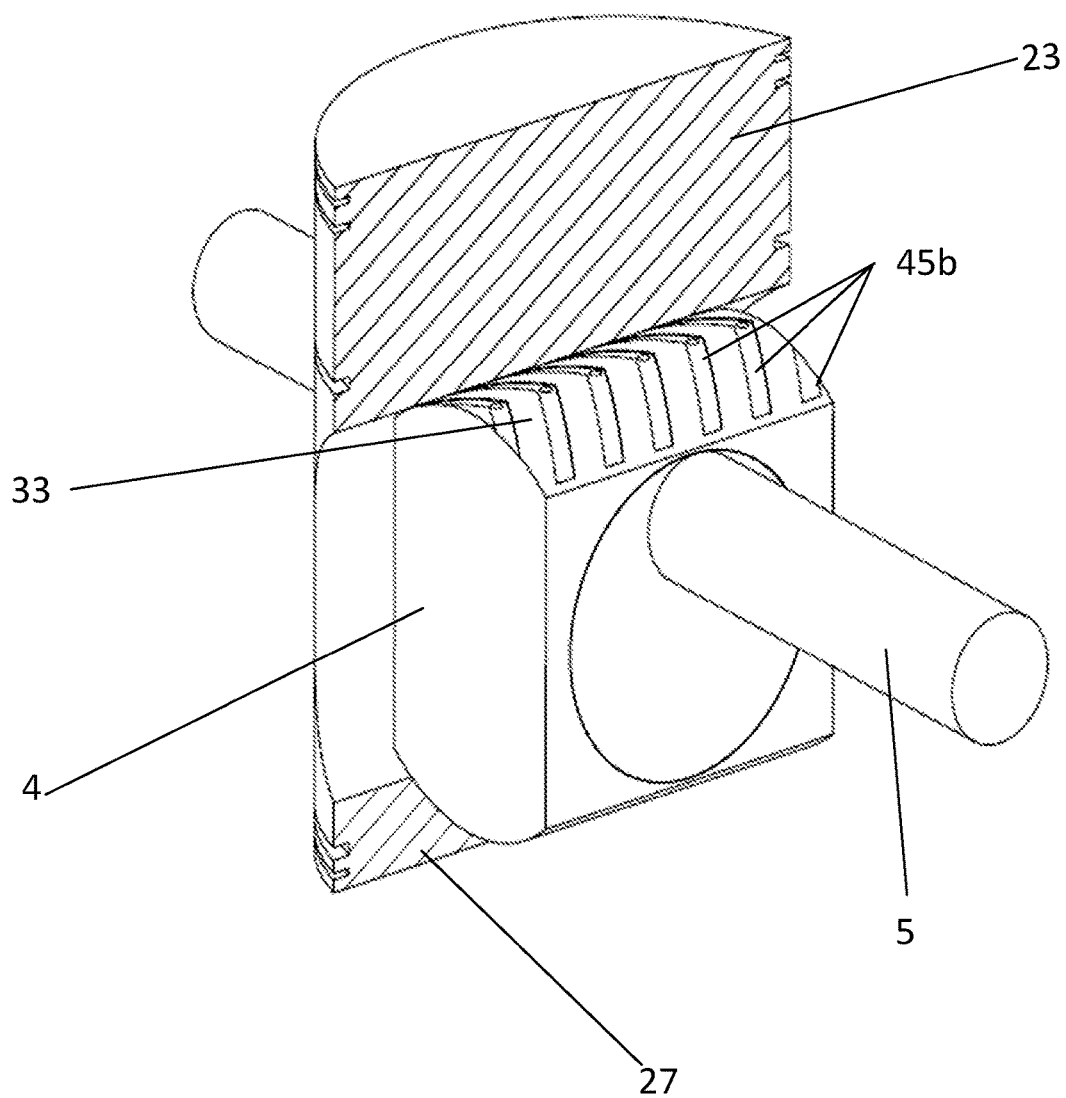

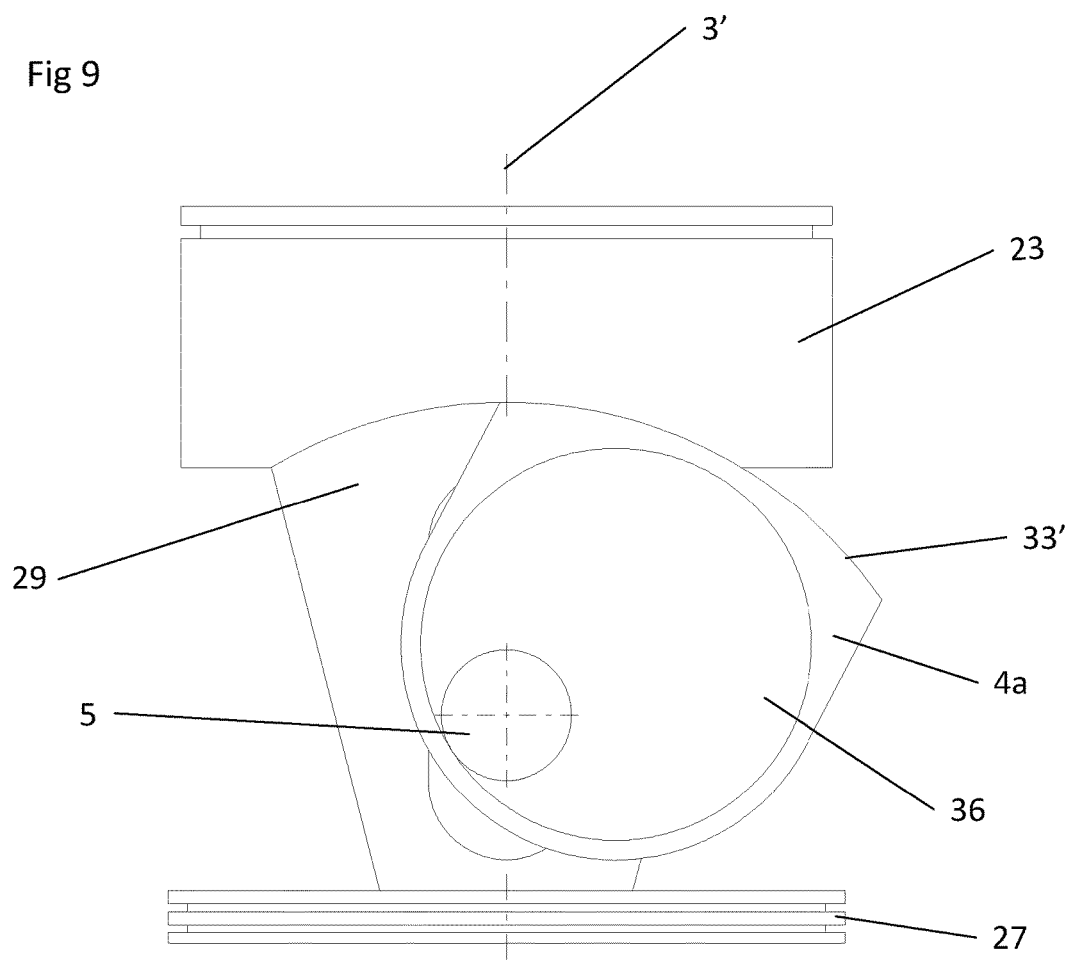

PISTON ARRANGEMENT AND INTERNAL COMBUSTION ENGINE

The present application is a continuation of co-pending Ser. No. 14/406,164, which is a submission under 35 USC § 371 of international application no. PCT/GB2013/051677, filed on 25 Jun. 2013 and published in the English language with publication no. WO 2014/001788 A1 on 3 Jan. 2014, which claims the benefit of the filing date of GB 1211490.6, filed 28 Jun. 2012.

FIELD OF THE INVENTION

The invention relates to a piston arrangement and to an internal combustion engine.

BACKGROUND OF THE INVENTION

Conventional internal combustion engines operating on either a two-stroke or a four-stroke cycle commonly use a crankshaft and con rod arrangement to convert linear motion of a piston to rotary motion at an output shaft. Due to the crankshaft and con rod geometry, maximum piston acceleration generally occurs when the piston is at top dead centre (TDC), where piston acceleration is significantly greater than at bottom dead centre (BDC).

High piston acceleration at TDC poses several problems for engine performance. For example, in a spark ignition engine, the reduced TDC dwell time (time spent at or near TDC) associated with increased TDC piston acceleration increases the required spark advance, therefore reducing efficiency, particularly at high engine speeds. In a compression ignition engine the reduced TDC dwell time decreases the engine speed limit which is limited by the burn speed of the fuel. The difference in piston acceleration at TDC and BDC also requires a compromise to be made when designing the engine counterbalancing system, so the engine is less well vertically balanced. In addition, the high maximum acceleration forces experienced at TDC inflict severe stresses on engine components, therefore increasing the design requirements and the weight of the engine and reducing the lifespan of the con rod and piston. The problems associated with high accelerations and increased component loading at TDC are not confined to internal combustion engines but apply generally to any piston arrangement for converting reciprocating linear motion to rotary motion or vice-versa, for example a pump.

Several alternative engine arrangements are known which use different combustion chamber to output shaft coupling mechanisms to reduce maximum piston acceleration and increase TDC dwell time. For example, the Pattakon Greco engine, the Bourke engine, the Revetec engine and the Wankel engine all use different mechanical coupling solutions to address the above-mentioned problems. However, each of these alternative coupling arrangements suffers from several disadvantages. For example, the Pattakon Grekko, Bourke and Revetec engines all transmit a drive force from a piston to an output shaft via a line contact patch, resulting in high stress concentrations and increased wear rates. The Pattakon Grekko, Revetec and Wankel engines also require the machining of complex, high-precision cam shapes, which are difficult and expensive to manufacture.

In addition to the problems mentioned above, conventional two-stroke engines also suffer from problems with lubrication of the crankshaft and con rod assembly. The crankshaft and con rod assembly is generally housed within a crank case forming part of the induction system. The lubrication system operates as a total loss system in which lubricating oil is continuously fed into the crank case and allowed to pass into the combustion cylinder and thence out of the engine. This total loss lubricating system is both expensive to run due to the need to continuously replace the lubricating oil and damaging to the environment due to the presence of lubricating oil in the exhaust gases. The use of the crank case as a supercharging or induction chamber also limits the ability of engine designers to optimise the volume and shape of the induction chamber to maximise performance and efficiency of the engine.

SUMMARY OF THE INVENTION

A first aspect of the invention provides a piston arrangement comprising: a piston, a first chamber, a second chamber and a power transfer assembly; wherein the piston comprises a first head movable within the first chamber and a second head movable within the second chamber; wherein, in operation, the piston follows a linear path in reciprocating motion along a first axis; wherein the power transfer assembly comprises a shaft rotatably coupled to a shuttle bearing and arranged to convert the reciprocating motion of the piston to rotary motion of the shaft; wherein the shuttle bearing moves relative to the piston in reciprocating motion along a second axis substantially transverse to the first axis; and wherein the shuttle bearing is coupled to the piston via a non-planar bearing surface thereby allowing rotation of the shuttle bearing.

The piston arrangement may generally be applied to any engine or pump or any other mechanical arrangement requiring the conversion of reciprocating linear motion to rotary motion or vice-versa.

A shuttle bearing is defined as a component which bears against another component and moves relative to the component against which it bears along a movement path in reciprocating motion. The movement path may be substantially linear.

By connecting the shaft to the piston via a shuttle bearing (as opposed to a conventional crankshaft and con-rod arrangement), the power transfer assembly allows better control of piston motion and the reduced acceleration spikes. For example, TDC piston acceleration may be reduced and TDC dwell time may be increased. Reducing TDC piston acceleration reduces peak loading of the transfer assembly, and therefore wear rates are reduced and the weight of the power transfer assembly components can be minimised. When the invention is applied to an internal combustion engine, increasing TDC dwell time increases combustion efficiency and allows a reduction in spark advance for spark ignition engines or increased maximum engine speed for compression ignition engines. Reducing or eliminating the difference between TDC and BDC acceleration also allows a counterbalancing system to be optimised bore efficiently top control vibrations at TDC and BDC.

The non-planar bearing surface may be arranged to allow rotation of the shuttle bearing about the second axis and/or about a third axis which is substantially transverse to the first and second axes.

By allowing rotation of the shuttle bearing about the second axis the shuttle bearing can maintain good contact with the piston in the case of slight misalignment of any of the components in the power transfer assembly. The piston arrangement is therefore better able to withstand misalignment of components due to manufacturing errors and/or uneven wear of components. The piston arrangement is also less susceptible to wear. The curvature of the bearing surface allowing rotation of the shuttle bearing about the second axis may have an arc which extends through an angle of at least 1°, or at least 2°, or at least 5°, or at least 10°, or at least 15°, or at least 20°. The curved bearing surface may extend up to 360° around the entire shuttle bearing. The degree of rotation of the shuttle bearing about the second axis during operation of the engine is, of course, limited by the other components in the power transfer assembly.

By rotating the shuttle bearing about the third axis the piston displacement may be controlled. For example, piston acceleration about TDC may be further reduced thereby decreasing peak loading and further increasing TDC dwell time. The curvature of the bearing surface allowing rotation of the shuttle bearing about the third axis may have an arc which extends through an angle of at least 1°, or at least 2°, or at least 5°, or at least 10°, or at least 15°, or at least 20°. The degree of rotation of the shuttle bearing about the third axis during operation of the engine is, of course, limited by the other components in the power transfer assembly.

The shuttle bearing may comprise one or more convex bearing surfaces.

The piston may comprise one or more concave bearing surfaces corresponding to the one or more convex bearing surfaces of the shuttle bearing. The concave bearing surface(s) of the piston may be provided in a main body of the piston itself. Alternatively the bearing surfaces of the piston maybe provided via intermediate components which are attached to the piston.

The interface between the piston and the shuttle bearing may appear circular or part circular when viewed in the direction of the second axis and/or in the direction of the third axis. For example the interface may include one or more arcs of one or more circles.

The interface between the piston and the shuttle bearing may be cylindrical or part-cylindrical such that the shuttle bearing can rotate about a single axis during use of the engine. Alternatively the interface may be spherical or part-spherical such that rotation about two different perpendicular axes is permitted.

The piston may comprise a bore extending through its thickness in a direction substantially parallel to the second axis, and the shuttle bearing may be received in the bore. The bore may be circular or substantially circular. Alternatively the piston may comprise a slot extending through its thickness in a direction substantially parallel to the second axis, and the shuttle bearing may be received in the slot. The slot may include one or more walls extending in the direction of the second axis which are part-cylindrical or part-spherical and which engage the shuttle bearing allowing rotation of the shuttle bearing about one or more axes.

The shuttle bearing may be substantially cylindrical or part-cylindrical and have a longitudinal axis parallel to the second axis. The shuttle bearing may generally take any shape having cylindrical or part-cylindrical or spherical or part-spherical bearing surface(s) for coupling the shuttle bearing to the piston.

At least one bearing surface of the piston and/or shuttle bearing may comprise one or more groves formed therein. The grooves may be substantially straight, curved, chevron shaped or take any other suitable form. The grooves may assist with hydrodynamic lubrication, improving the distribution of lubricant between the shuttle bearing and the piston and reducing sliding friction and wear at the bearing surfaces.

Lubricant, for example engine oil, may be supplied to the interface(s) between the shuttle bearing and the piston. Lubricant may, for example, be supplied directly to the bearing surface(s) via lubricant lines passing through the piston arrangement and or supplied externally via spray-jets. Any other known engine lubrication system may be used.

The shaft may be rotatably coupled to the shuttle bearing at an eccentric portion of the shaft. The eccentric portion may, for example, comprise a crank-pin of a crankshaft or a cam-lobe of a camshaft. The eccentric portion may be received in a bore of the shuttle bearing, and may contact the shuttle bearing by a circular bearing, for example a plain bearing or a roller element bearing. The piston may exert a force on the eccentric portion via the shuttle bearing thereby creating a torque at the shaft and/or the eccentric portion may transmit a force to the piston via the shuttle bearing in response to a torque applied at the shaft.

The second head may have the same or a different outer diameter to that of the first head. The first and second cylinders may therefore be dimensionally optimised individually.

The second head may be rigidly held in fixed relation to the first head. For example, the second head may be integrally formed with the first head. Alternatively the first and second heads may be formed as discrete components and attached together. The first and second heads may be joined by one or more linking elements or arms. The linking element(s) may include slot(s) and/or be spaced apart to receive the shaft and/or shuttle bearing.

The first head and the second head may face away from each other in opposite directions.

The first head and the second head may both be centred on the first axis and may each move in reciprocating motion along the first axis.

The shuttle bearing may directly or indirectly engage the piston. For example the shuttle bearing may be in sliding contact with a reverse face of the first and/or second piston heads. Alternatively the shuttle bearing may be coupled to the piston via one or more intermediate components, for example one or more bearing elements or rollers.

The first chamber and/or the second chamber may comprise a movable wall in addition to the first and/or second heads.

A second aspect of the invention provides an internal combustion engine comprising the piston arrangement of the first aspect. The first chamber may be a combustion chamber. The engine may use fuel injection, for example direct injection or port injection, or may use a carburetor. An internal combustion engine may comprise one or more of the piston arrangements arranged in any known orientation, for example an "in-line" or "V" arrangement.

The internal combustion engine may be a two-stroke or four-stroke engine. The engine may be a spark ignition or a compression ignition engine.

The second chamber may be a supercharging chamber arranged to supply inlet air to the combustion chamber. Alternatively the second chamber may be a second combustion chamber.

The internal combustion engine may comprise a transfer port extending between the supercharging chamber and the combustion chamber. The transfer port may have an outlet at the combustion chamber which is opened and closed by the reciprocating motion of the first head.

The internal combustion engine may comprise an oil seal mounted to a cylinder wall of the first chamber. The oil seal may be mounted to the cylinder wall on the opposite side of the transfer port to the combustion chamber. The first head may comprise an extended piston skirt which remains in continuous contact with the oil seal during reciprocating movement of the piston.

The first head may alternatively comprise an oil seal mounted to the extended piston skirt which remains in continuous contact with the cylinder wall beneath the cylinder ports.

The internal combustion engine may comprise a gas seal mounted to the first head. The gas seal may be positioned such that it passes the outlet of the transfer port during operation of the engine.

A supercharging head in the second cylinder may not require an extended piston skirt and may include an oil seal mounted to the second head which maintains contact with a substantially uninterrupted portion of a bore of the second cylinder. Alternatively the second cylinder may be a ported supercharging cylinder and the second head may cover and uncover the port to act as an intake timing valve. In this case the second head may also feature an extended piston skirt.

The power transfer assembly may be housed within an intermediate chamber located between the first and second chambers. The intermediate chamber may be sealed to substantially prevent the passage of fluid past the first and/or second head into or out of the first and/or second chambers.

By locating the power transfer mechanism between the working head and the shaft in the intermediate chamber and supplying inlet air to the combustion chamber from a separate supercharging chamber, the invention eliminates the need to provide lubrication to the coupling between the piston and the shaft using a total loss lubrication system. The cost of running the engine may therefore be reduced because it is not necessary to continually replace lubricating oil which is being passed out of the engine with exhaust gases. The engine may also be more environmentally friendly because oil is not passed out of the engine with the exhaust gases. Additionally the engine may be less susceptible to wear because the mechanical coupling between the piston and the shaft may be more efficiently lubricated.

BRIEF DESCRIPTION OF THE DRAWINGS

Embodiments of the invention will now be described with reference to the accompanying drawings, in which:

FIGS. 2a, 2b, 3 and 4 show the piston arrangement for the engine of FIG. 1;

FIG. 5 shown a cross section view of the engine of FIG. 1;

FIGS. 8a and 8b show the piston arrangement for an engine in an alternative embodiment of the invention;

FIGS. 9 and 10 show an engine according to an alternative embodiment of the invention.

DETAILED DESCRIPTION OF EMBODIMENT(S)

Figure 1:
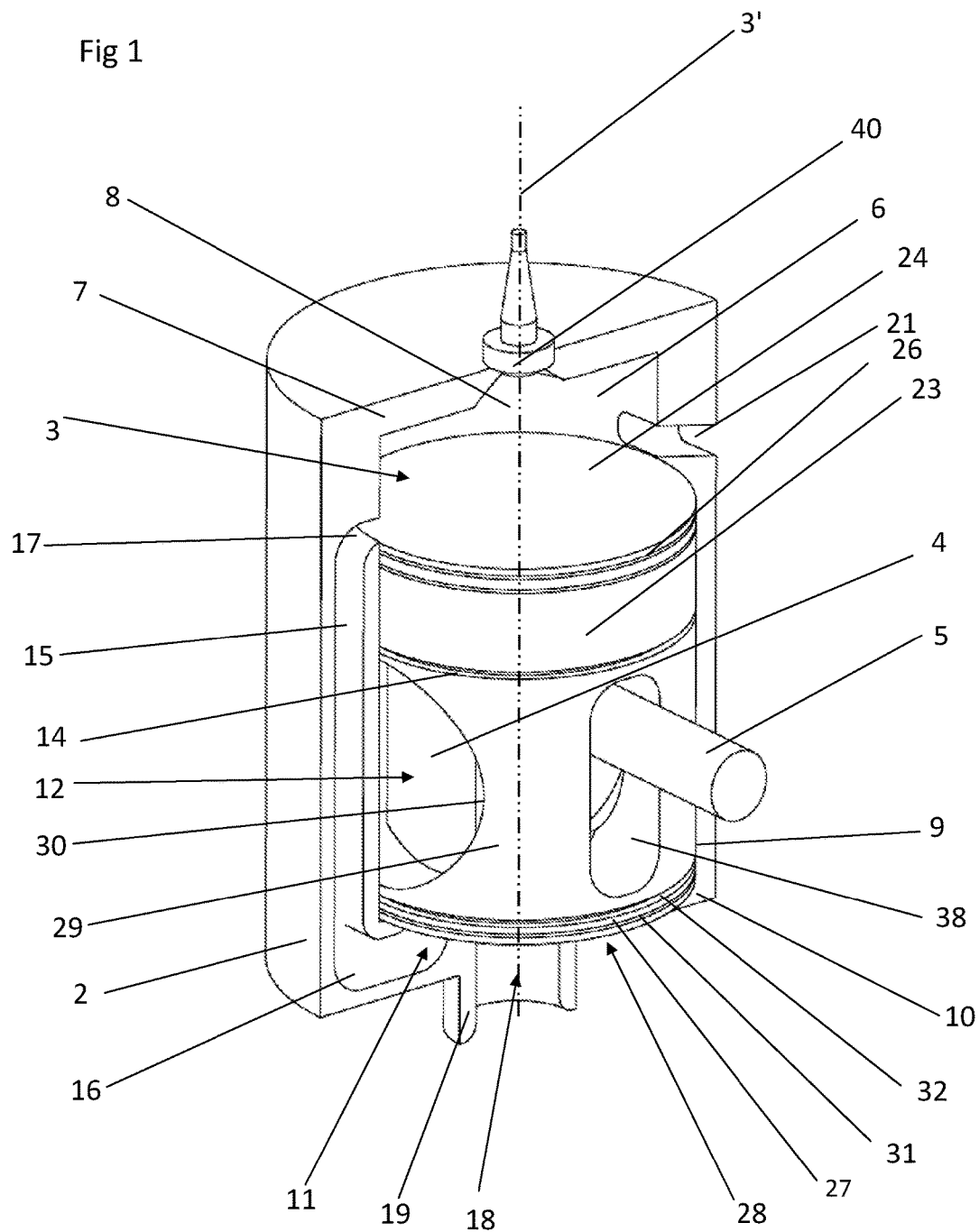
FIG. 1 shows an engine according to an embodiment of the invention.
Figure 2A:
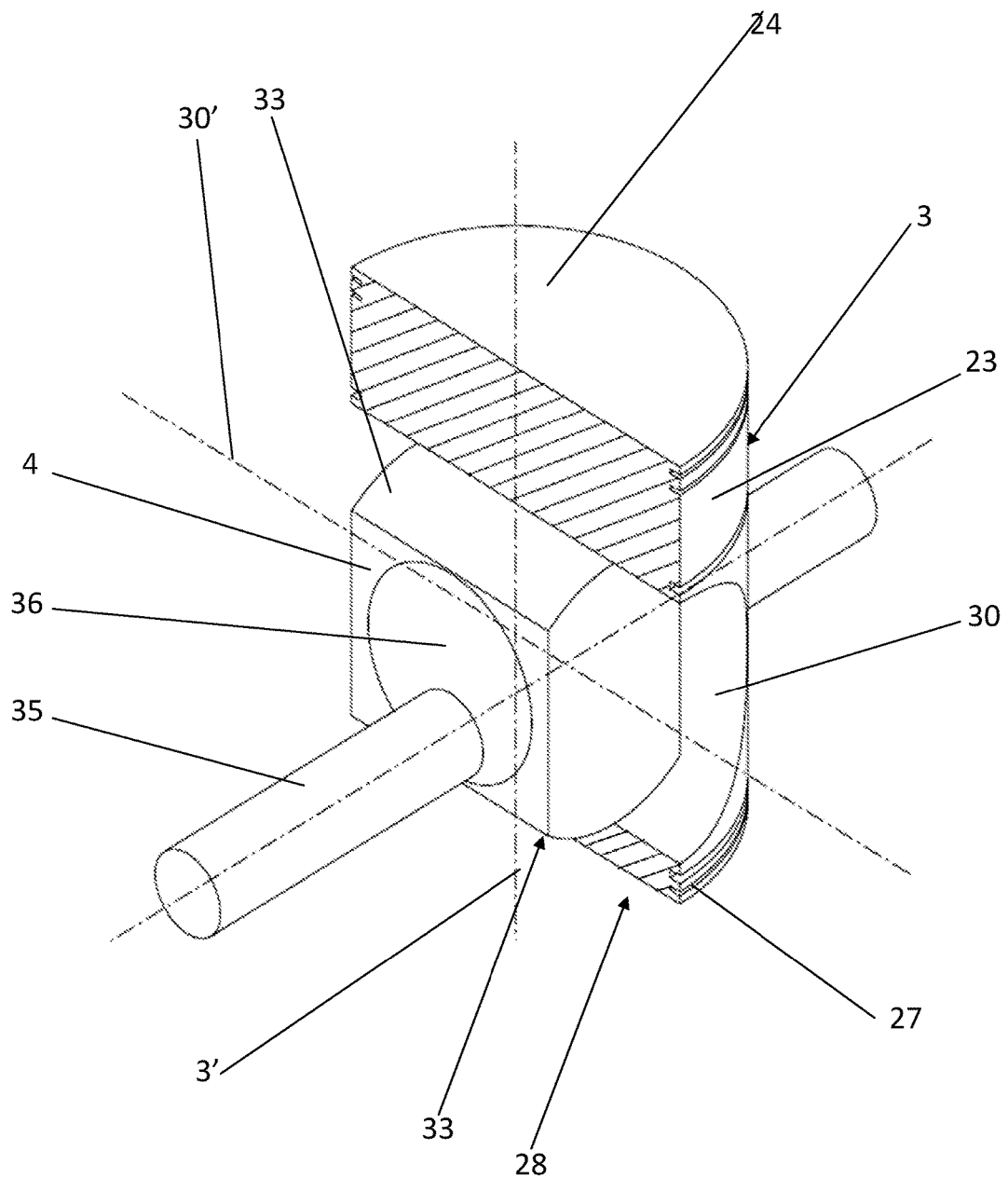

FIG. 1 shows a single cylinder, spark ignition two-stroke engine 1 according to one embodiment of the invention. The engine is shown and described in one possible orientation, however it is envisaged that the engine may be operated at any angle and the terms upper, lower and base etc. should be construed accordingly. The engine 1 includes a casing 2 (shown in partial cut-away in FIG. 1) and a piston 3 which is movable within the casing 2 in reciprocating motion in the direction of its axis 3'. The engine has a linear-to-rotary power transfer mechanism coupled to the piston including a shuttle bearing 4 and a camshaft 5. The power transfer mechanism is shown in more detail in FIGS. 2a to 5.

The casing 2 includes a first bore 6 and an upper wall 7 defining in part a working cylinder or combustion chamber 8. The casing 2 further includes a second bore 9 and a base wall 10 defining in part a supercharging cylinder or supercharging chamber 11. An intermediate chamber 12 is defined between the combustion chamber 8 and the supercharging chamber 11. The upper wall 7 has a threaded bore in which a spark plug 40 is fitted. The base wall 10 is curved inwardly into the supercharging chamber 11.

Figure 6A:
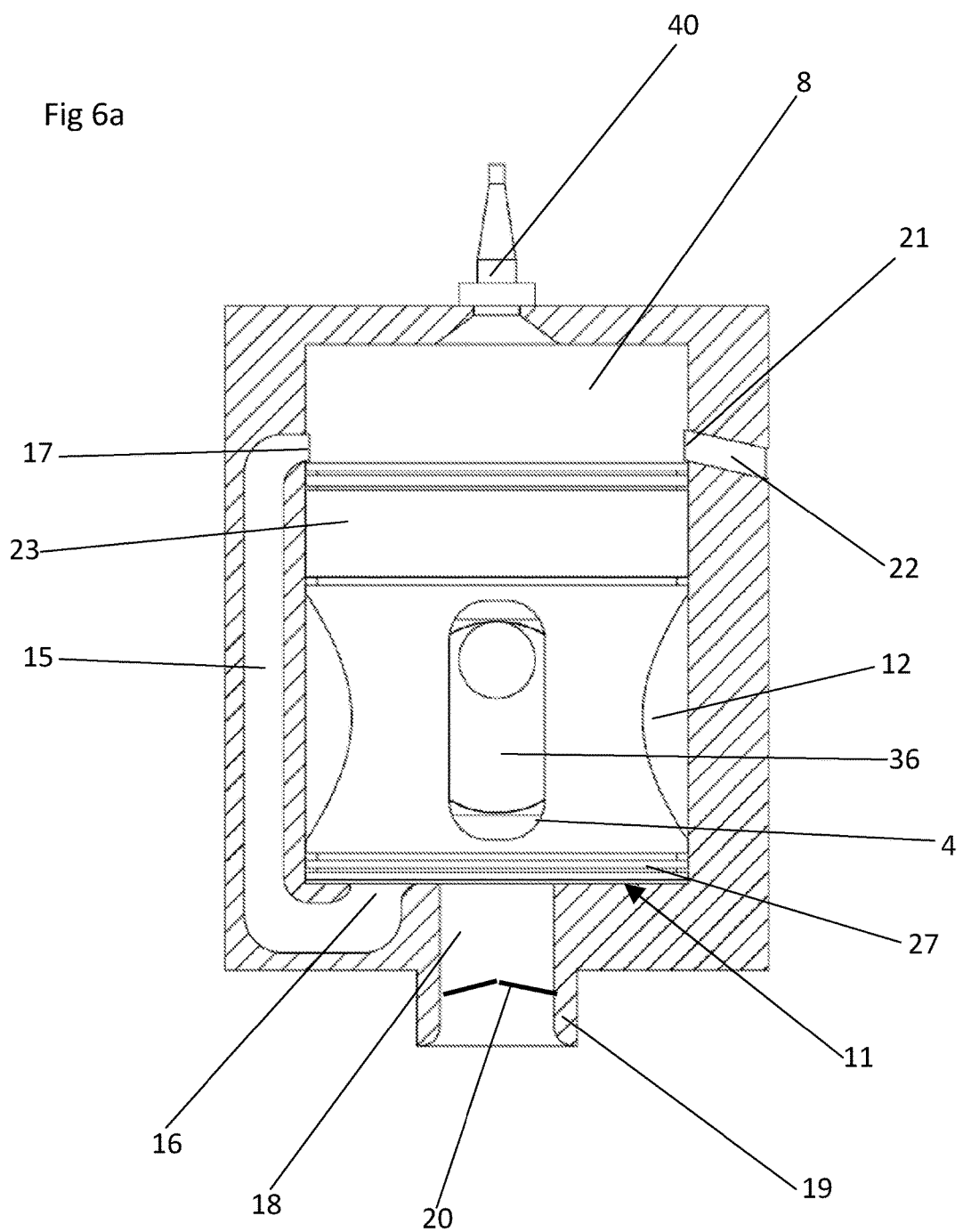
FIGS. 6a to 6d show schematic views of the engine of FIG. 1 at different points in an operating cycle.
Figure 6B:
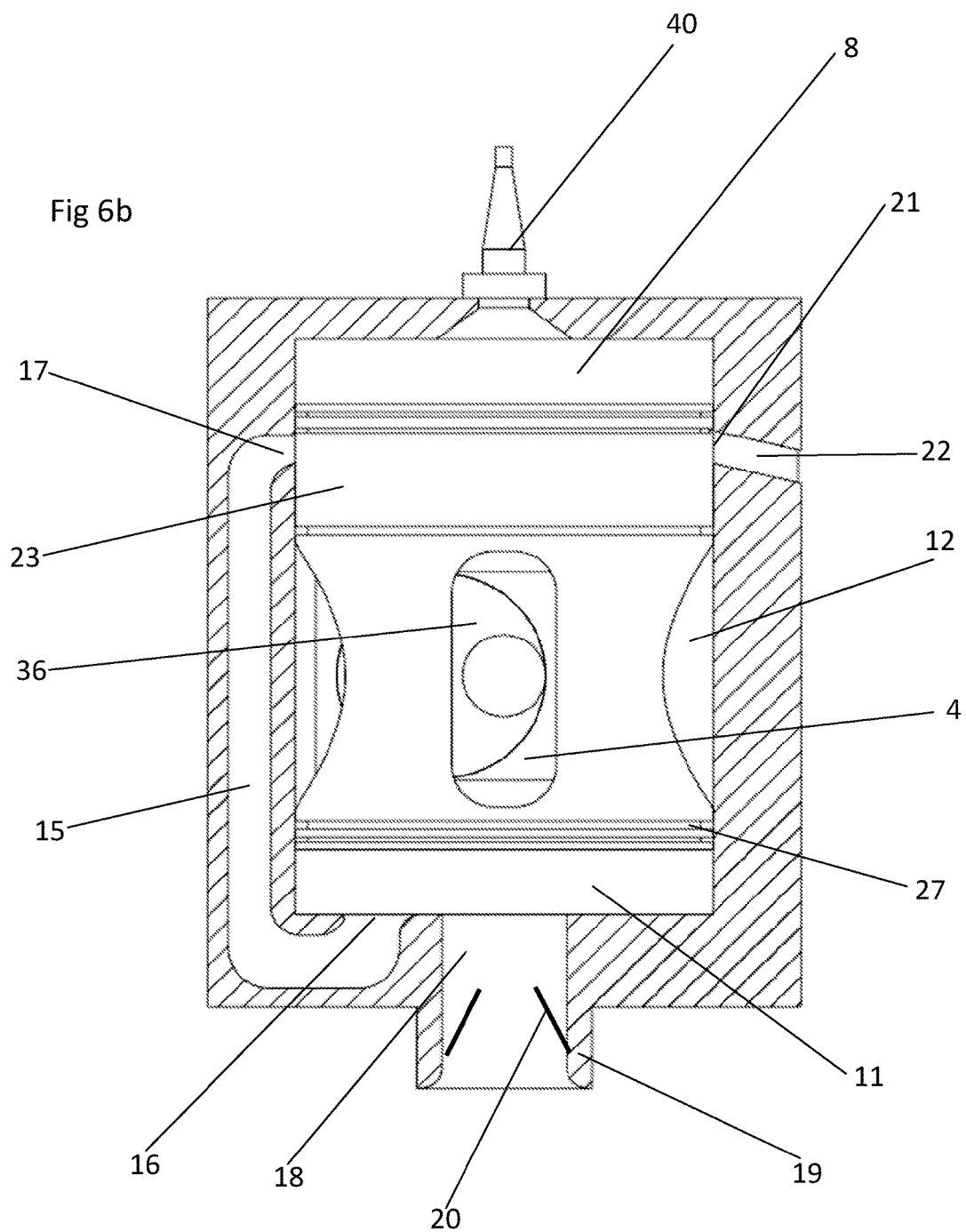

The combustion chamber 8 is connected to the supercharging chamber 11 by a transfer port 15 having an inlet 16 at the supercharging chamber and an outlet 17 at the combustion chamber. The combustion chamber 8 also has an exhaust port 21 connected to an exhaust duct 22, as shown in FIGS. 6a to 6d. The supercharging chamber 11 has an intake port 18 connected to an intake duct 19 including a one way valve 20 located approximately centrally in its base wall 10, as shown in the schematic views of FIGS. 6a to 6d. FIG. 6e shows the schematic view, at the same point in an operating cycle as is shown in FIG. 6a, for an embodiment in which first and second chambers have the same diameter and first and second heads have different outer diameters.

The piston 3 includes a first head or working head 23 which is movable within the first bore 6 and has a working face 24 which forms the lower boundary of the combustion chamber 8. The working head 23 has an extended piston skirt extending away from the working face 24. An oil seal 14 is mounted to the piston skirt sufficiently far from the working face 24 that it does not pass the intake and exhaust ports 17 and 21 during reciprocating motion of the piston 3. Alternatively a static oil seal may be mounted to the wall of the combustion chamber 8 and the skirt of the working head 23 may maintain continuous contact with the oil seal during reciprocating motion of the piston 3. The working head has gas seal rings 26 fitted in grooves formed in its cylindrical outer surface which provide a gas-proof seal between the working head and the first bore 6.

The piston 3 also includes a second head or supercharging head 27 which is movable within the second bore 9 and has a working face 28 which forms a movable upper boundary of the supercharging chamber 11. The supercharging head 27 has gas seal rings 31 and a second oil seal ring 32 fitted in grooves formed in its cylindrical outer surface which provide a gas-proof and oil-proof seal between the supercharging head and the second bore 9.

The piston 3 further includes a circular bore 30 extending through its extent and having an axis 30' (the second axis) substantially transverse to the piston axis 3'. The piston 3 further includes a slot 38 extending through its extent in a direction substantially perpendicular to the piston axis 3' and to the second axis 30'. The supercharging head 27 is connected to the working head 23 by four linking elements 29, which together define the bore 30 and the slot 38.

The shuttle bearing 4 is received within the bore 30 and has first and second part-cylindrical bearing surfaces 33 which engage the bore of the piston 3. The bearing surfaces 33 are provided with recessed grooves 45a or 45b (shown in FIGS. 8a and 8b) for aiding with hydrodynamic lubrication.

The shuttle bearing includes a bore 34 extending through its thickness and having an axis (the third axis) in a direction perpendicular to the piston axis 3' and to the second axis 30'.

As best shown in FIGS. 2a to 4, the output shaft 5 has a main shaft portion 35 and an eccentric portion 36. The main shaft portion 35 is rotatably mounted on bearings (not shown) in the casing 2 and passes through the slot 38 of the piston 3. The eccentric portion 36 appears circular when viewed in the direction of the third axis. In the embodiment shown in FIGS. 1 to 4 the eccentric portion 36 is solid but in an alternative embodiment the eccentric portion may include cut outs to reduce weight. The eccentric portion 36 is rotatably mounted in the bore 34 of the shuttle bearing 4.

Figure 6C:
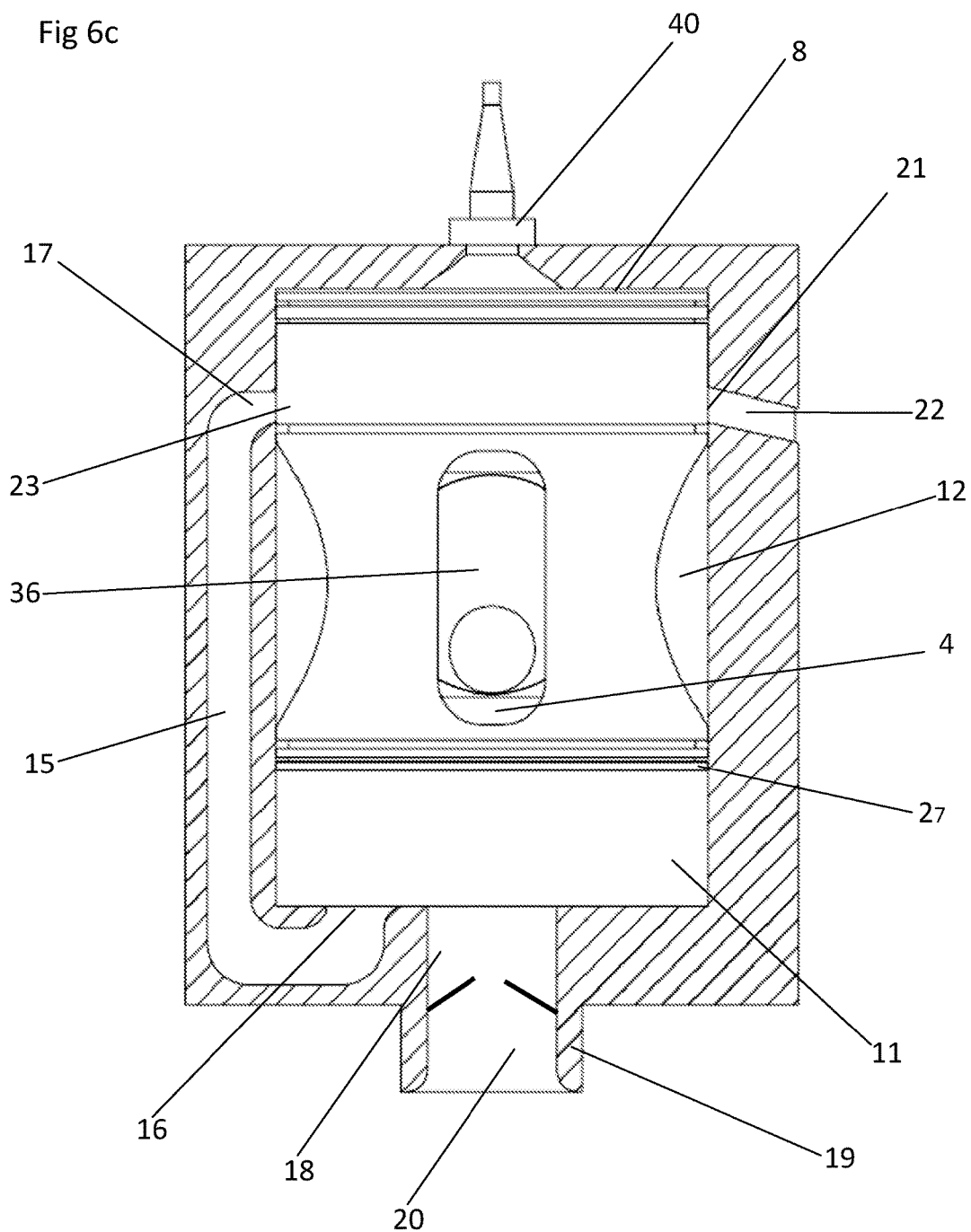

The piston 3 is movable relative to the casing 2 in reciprocating motion in the direction of its axis 3' between a top dead centre position (TDC), as shown in FIG. 6c, and a bottom dead centre position (BDC), as shown in FIG. 6a. TDC and BDC refer to specific positions of the piston during an operating cycle and apply irrespective of the orientation of the engine. When the piston 3 is at TDC the working face 24 of the working head 23 is at its closest position to the upper wall 7 so that the volume of the combustion chamber 8 is at its minimum and the working face 28 of the supercharging head 27 is at its furthest position from the base wall 10 so that the volume of the supercharging chamber 11 is at its maximum. When the piston 3 is at BDC the working face 24 of the working head 23 is at its furthest position from the upper wall 7 so that the volume of the combustion chamber 8 is at its maximum and the working face 28 of the supercharging head 27 is at its closest position to the base wall 10 so that the volume of the supercharging chamber 11 is at its minimum.

Figure 7:
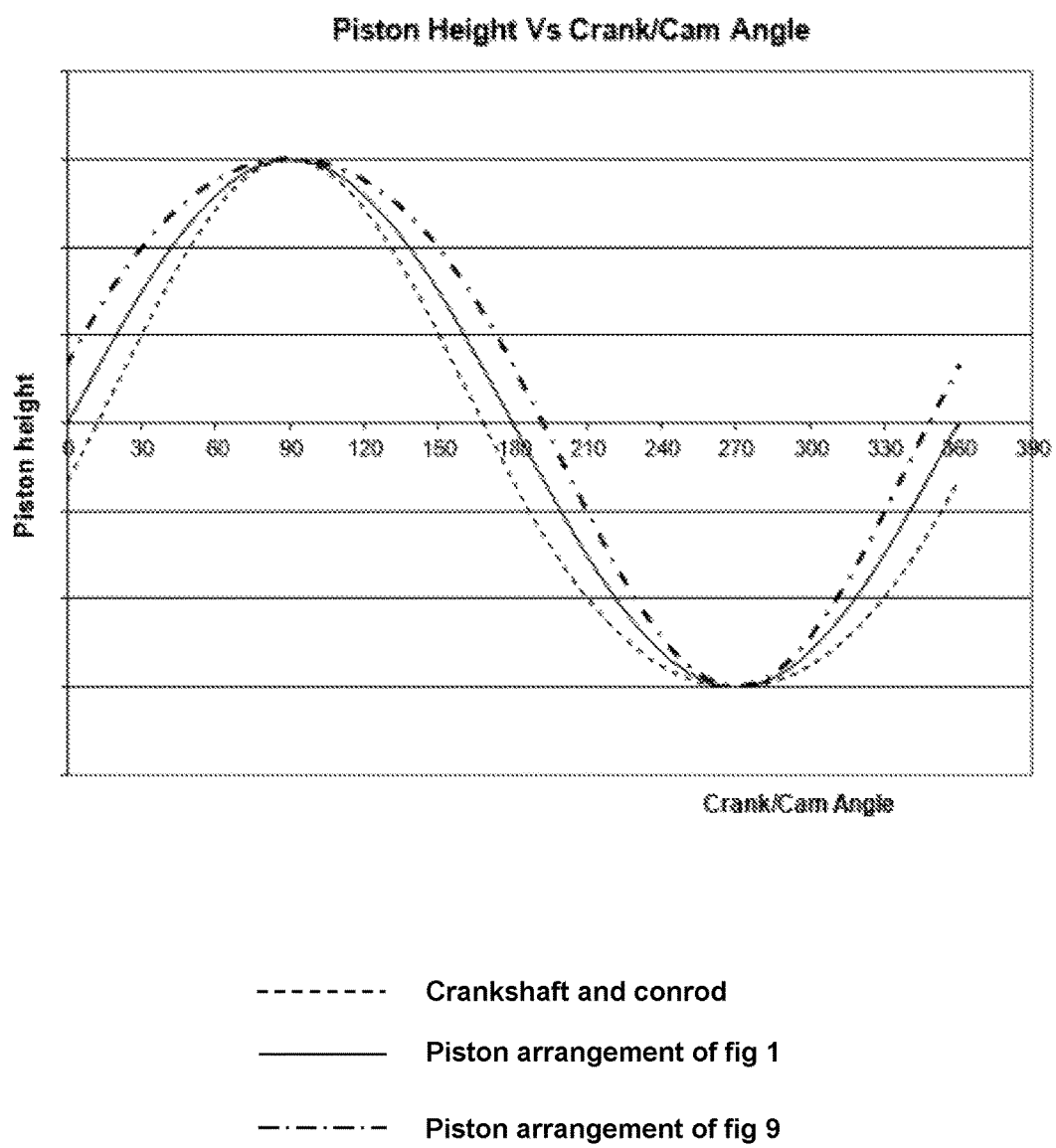
FIG. 7 shows a graph of piston height vs output shaft angle for several different piston arrangements.

As the piston 3 moves along its axis 3' in reciprocating motion between TDC and BDC, the part-cylindrical bearing surfaces 33 of the shuttle bearing 4 remain in sliding contact with the bore 30 of the piston 3, and the shuttle bearing 4 moves with the piston in the direction of the piston axis. The eccentric portion 36 additionally causes the shuttle bearing 4 to move relative to the piston along a movement path substantially aligned with the second axis 30' in reciprocating motion. The shuttle bearing 4 generally follows a circular path 39 about the centre-line of the shaft 5, and moves with the centre point of the rotating eccentric portion 36, as indicated in FIG. 3. The shuttle bearing 4 and the piston 3 follow simple harmonic motion in the direction of the piston axis 3' with respect to the angle of rotation of the output shaft 5, as indicated in FIG. 7.

The linear to rotary power transfer mechanism (including the bore 30 of the piston 3, the shuttle bearing 4 and the output shaft 5) is located within the intermediate chamber 12. The intermediate chamber 12 does not form part of the intake system for the engine 1 and is substantially sealed from the combustion chamber 8 and the supercharging chamber 11 by the gas seal rings 26,31 and the oil seal rings 14,32.

Figure 8A:
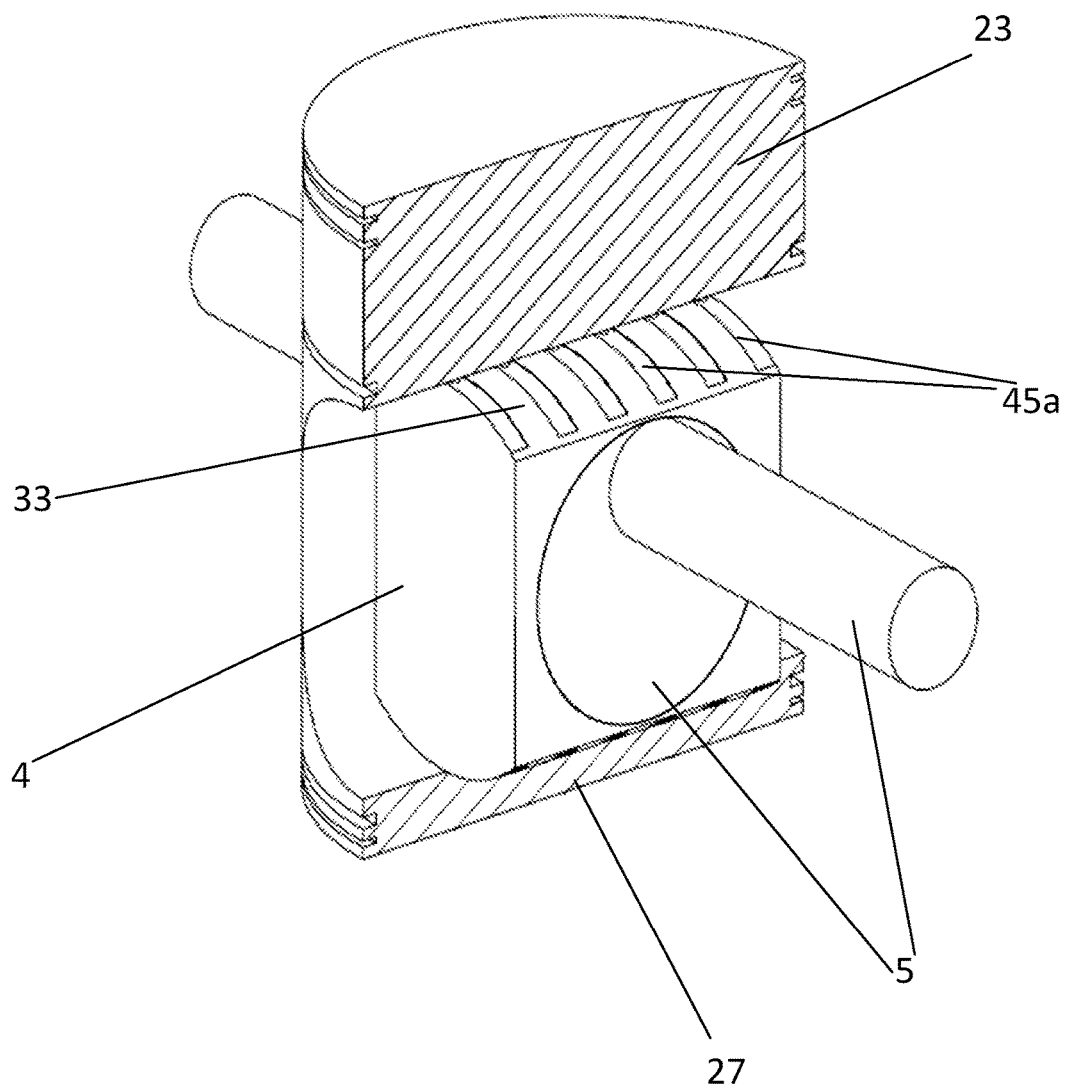

The engine has a lubrication system which lubricates the power transfer mechanism within the intermediate chamber. Part of the lubrication system is shown in the cross section view of FIG. 5 taken along the centre-line of the output shaft 5. The lubrication system includes an oil supply line 50 passing through the main shaft portion 35 which is connected to oil feed lines 51 extending radially outwardly through the eccentric portion 36. The oil feed lines have outlets at the outer radial surface of the eccentric portion 36 through which oil is supplied to lubricate the interface between the eccentric portion and the bore 34 of the shuttle bearing 4. The shuttle bearing 4 has at least one oil transfer port 52 extending between the bore surface 34 and at least one of the part-cylindrical bearing surfaces 33, through which oil is supplied to lubricate the interface(s) between the bearing surfaces 33 and the bore 30 of the piston 3. The oil transfer ports 52 have outlets at the grooves 45a or 45b, as shown in FIGS. 8a and 8b. The lubrication system is dry sumped and includes a sump tank (not shown) connected to the intermediate chamber. The lubrication system may also include wall mounted oil spray jets (not shown) which spray oil towards the power transfer mechanism.

The engine 1 includes a counterbalancing system (not shown) to counteract vibrations due to piston acceleration at TDC and BDC. The counterbalancing system is located outside the intermediate chamber 12 at or adjacent a flywheel. In alternative embodiments the counterbalancing system may be located inside the intermediate chamber 12.

Figure 6D:
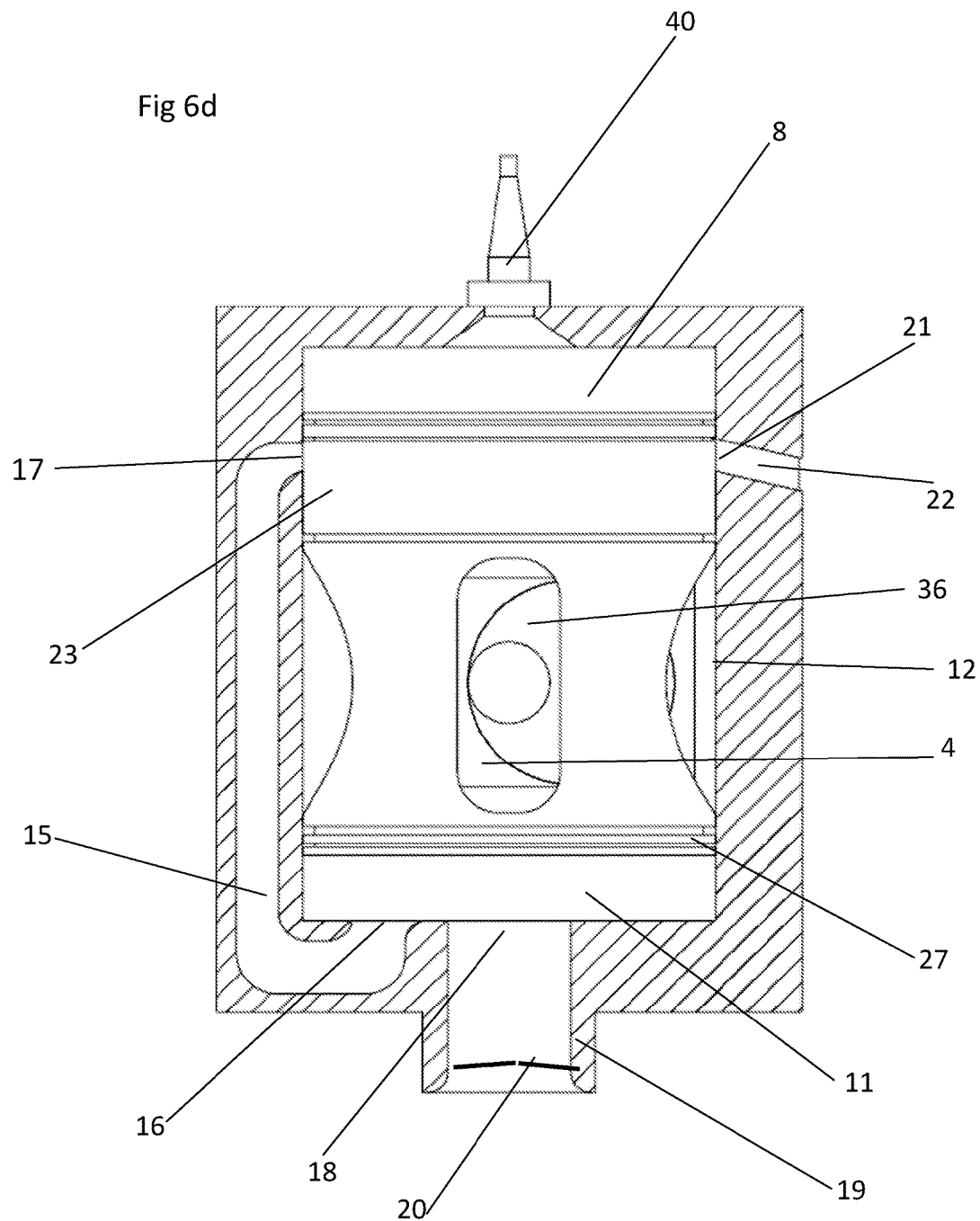
Figure 6E:
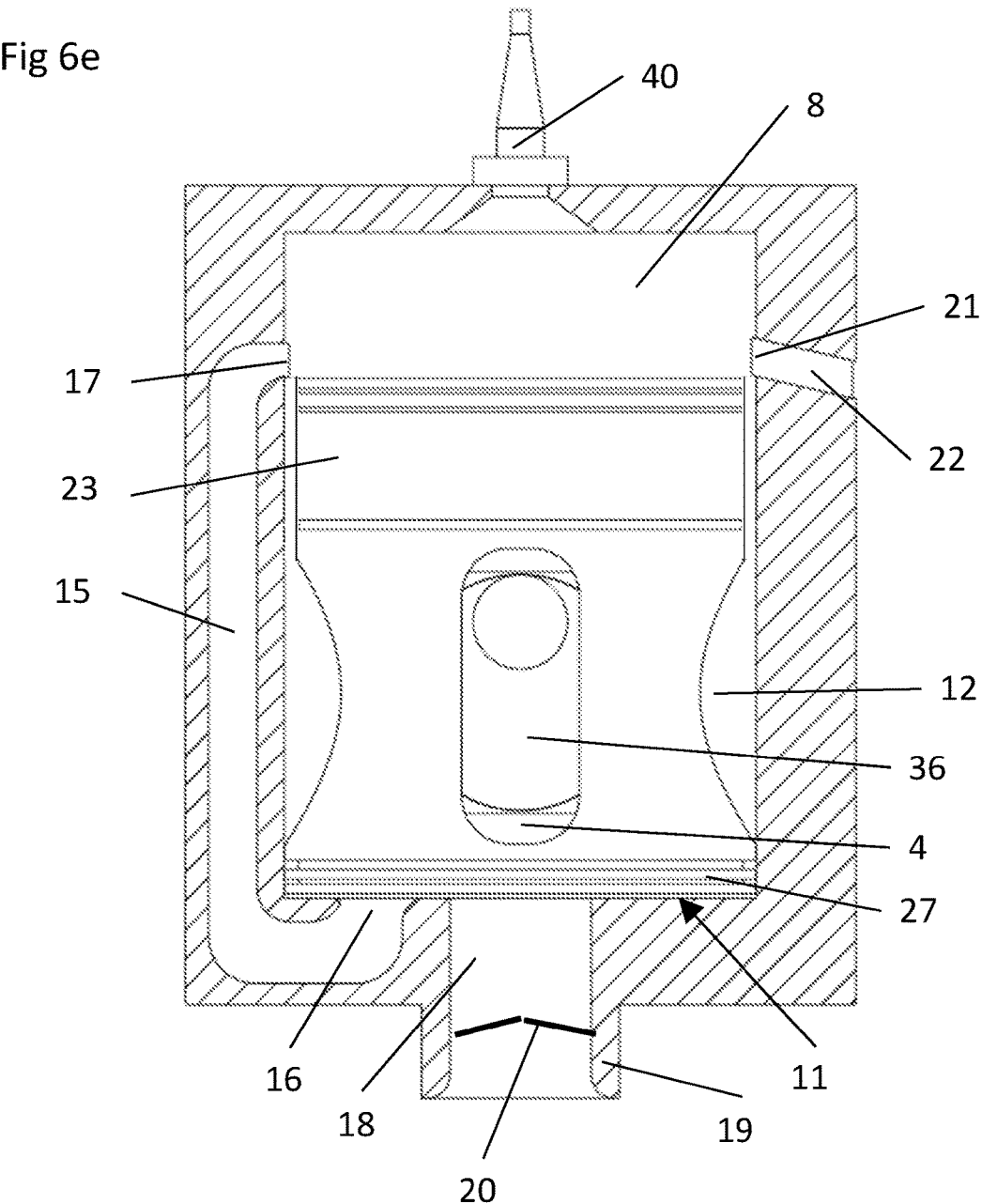
FIG. 6e shows the schematic view, at the same point in an operating cycle as is shown in FIG. 6a, for an embodiment in which first and second chambers have the same diameter and first and second heads have different outer diameters.

Starting from BDC, the engine operates as follows:

a) As the piston moves from BDC to TDC (FIGS. 6a to 6c) the working face 28 of the supercharging head 27 moves away from the base wall 10 of the supercharging chamber 11, thereby increasing the volume of the supercharging chamber. The increase in volume of the supercharging chamber 11 results in a decrease in pressure which causes one way valve 20 to open and intake gases to be drawn from the intake duct 19 into the supercharging cylinder. The intake gases include intake air and fuel which is mixed with the intake air by a carburetor or throttle body and fuel injector (not shown) upstream of the supercharging cylinder 11 to form a fuel/air mixture. Shortly after the piston leaves BDC the cylindrical outer surface of the working head 23 covers the outlet 17 of the transfer port 15 substantially preventing the movement of gases from the supercharging chamber 11 into the combustion chamber 8 through the transfer port 15.

b) As the piston reaches TDC (FIG. 6c) and begins to move towards BDC the working face 28 of the supercharging head 27 moves towards the base wall 10 of the supercharging chamber 11, thereby reducing the volume of the supercharging chamber and compressing the intake gases. The one way valve 20 closes to substantially prevent the flow of intake gases from the supercharging chamber 11 back into the intake duct 19.

c) Shortly before the piston 3 reaches BDC the piston skirt of the working head 23 uncovers the outlet 17 of the transfer port 15 and the exhaust port 21. Due to a pressure differential between the combustion chamber 8 and the supercharging chamber 11, intake gases flow through the transfer port 15 from the supercharging chamber 11 into the combustion chamber. The piston then reaches BDC (FIG. 6a) and begins to move back towards TDC.

d) Shortly after the piston 3 leaves BDC the piston skirt of the working head 23 covers the outlet 17 of the transfer port 15 and the exhaust port 21. As the piston moves from BDC to TDC (FIGS. 6a to 6c) the working face 24 of the working head 23 moves towards the upper wall 7 of the combustion chamber 8, thereby compressing the intake gases.

e) As the piston approaches TDC the spark plug 40 produces a spark which ignites the fuel/air mixture of the intake gases. The intake gases then burn within the combustion chamber, resulting in an increase in pressure. The increased pressure due to combustion exerts a combustion force of the working surface 24 of the working head 23, forcing the piston back towards BDC in a power stroke, as shown in FIGS. 6c, 6d and 6a. The combustion force is transmitted from the working head 23 through the reverse face and into the shuttle bearing 4 through the upper bearing surface 33 and thence into the eccentric portion 36, therefore applying a torque to the output shaft 5 so that the reciprocating motion of the piston 3 is converted into rotary motion of the output shaft.

f) As the piston approaches BDC the piston skirt of the working head 23 uncovers the outlet 17 of the transfer port 15 and the exhaust port 21. The burnt gases or exhaust gases are drawn out of the combustion chamber 8 through the exhaust port 21 into the exhaust duct 22. Fresh intake gases which have been compressed in the supercharging chamber 11 during the power stroke are then drawn through the transfer port 15 into the combustion chamber 8, displacing the exhaust gases.

The shuttle bearing and output shaft power transfer assembly of the invention provides a more compact, more robust and lighter weight linear to rotary motion coupling than the crankshaft and con rod arrangement of a standard two-stroke engine. The invention therefore allows an increase in strength and reduction in the size and weight of an engine so that power density and reliability is maximised.

FIG. 7 shows a graph of piston height vs output shaft angle for a conventional engine (with a crankshaft and con rod coupling arrangement) and for the engine 1 shown in FIGS. 1 to 6. By moving the piston 3 relative to the casing 2 in simple harmonic motion with respect to the angle of rotation of the output shafts 5a,5b, the engine allows increased TDC dwell time and reduced TDC piston acceleration compared to the conventional crankshaft and con rod driven engine.

By increasing TDC dwell time combustion efficiency is increased, for example more complete combustion of the fuel in the combustion chamber is allowed to occur, so that fuel consumption is reduced and emissions of unburnt hydrocarbons are reduced. In addition spark advance may be reduced and the engine may be allowed to run at higher engine speeds.

By reducing TDC piston acceleration, the engine 1 experiences reduced piston acceleration spikes at TDC and therefore reduced component loading. Therefore design requirements are reduced, so that the weight of the engine may be minimised. Reducing component loading also reduces wear rates and reduces the probability of early component failures, so the engine is more reliable, and has reduced maintenance requirements and repair costs.

Moving the piston 3 in simple harmonic motion also eliminates the difference in piston acceleration at TDC and BDC so that counterbalancing requirements at TDC and BDC are equalised. In this way a counterbalancing system may be provided for the engine 1 which balances piston acceleration both at TDC and BDC without having to compromise between balancing different accelerations at TDC and BDC.

By replacing the con rods of a standard two-stroke engine with a shuttle bearing arrangement, the invention eliminates the piston side load generally imparted to a piston in a conventional two-stroke engine. By reducing or eliminating piston side loads the invention reduces frictional losses of the engine so that efficiency is increased and reduces wear rates of the piston and cylinder side walls so that reliability is improved and maintenance costs are minimised.

Due to the lubrication of the power transfer mechanism in the intermediate chamber 12 in isolation from the intake system, the engine does not require a total loss lubrication system as operated for conventional two-stroke engines. The cost of running the engine 1 is therefore reduced because it is not necessary to continually replace lubricating oil which is being passed out of the engine with exhaust gases. The engine 1 is also more environmentally friendly because oil is not passed out of the engine with the exhaust gases. The four-stroke style contained lubrication system also allows more efficient lubrication than in a conventional two-stroke engine so that wear rates are reduced and reliability is increased, thereby reducing maintenance costs for the engine.

By using a dedicated supercharging chamber 11 to supply inlet air to the combustion chamber 8, the dimensions of the inlet system are not constrained by the geometry of the power transfer mechanism. The volume and shape of the supercharging chamber 11 may therefore be freely optimised to maximise engine performance and/or minimise fuel consumption and/or increase the range of engine speeds over which the engine delivers acceptable performance. The supercharging cylinder 11 may have the same or a different bore diameter to the combustion chamber 8.

The supercharging chamber 11 provides a significantly smaller intake chamber with a higher volume ratio than the crankcase/intake chamber of a conventional two-stroke engine. The engine 1 therefore allows greater compression of the intake gases before delivery to the combustion chamber so that volumetric efficiency is improved, thereby increasing engine performance.

By providing a separate supercharging chamber which does not house the power transfer assembly, the path of intake gases into and out of the supercharging chamber is simplified compared to a conventional two-stroke engine in which intake gases must pass the crankshaft, con rods and counterbalance weights. The volumetric efficiency of the engine is therefore increased.

By locating the intake port 18 approximately centrally within the supercharging chamber 11 and facing towards the supercharging head 27, the engine efficiency with which intake gases are drawn into the supercharging chamber is maximised, thereby increasing volumetric efficiency of the engine. The improved volumetric efficiency of the engine due to the benefits associated with the supercharging chamber described above may significantly reduce the dependency of the engine on gas harmonics and thus increase the length of the engine's usable power-band. Therefore the overall dimensions and weight of the engine including its exhaust system downstream of the exhaust port 21 may be significantly reduced without sacrificing performance or fuel efficiency.

A large contact area is provided between the piston 3 and the shuttle bearing 4 and between the shuttle bearing and the eccentric portion 36. By maximising the area across which the combustion force is applied from the piston 3 to the output shaft 5 the stress concentrations experienced by components in the power transfer mechanism are reduced. The reduced stress concentrations allow a reduction in the design requirements for the engine so that the weight of the engine may be minimised. The reduced stress concentrations also reduce component wear rates so the engine is more reliable and maintenance costs are minimised, especially compared to engines such as the Pattakon-Greco, Bourke or Revetec which transfer loads from a piston to a shaft via a point or line contact.

The piston 3, shuttle bearing 4 and output shaft 5 are all comparatively simple components to machine using standard manufacturing techniques and tooling. The engine components are therefore less difficult and less expensive to manufacture than, for example, the cams used in a Pattakon- Greco engine, a Revetec engine or a Wankel engine, all of which require very precise machining of complex shapes.

The part-cylindrical interface between the shuttle bearing 4 and the piston 3 allows the shuttle bearing to partially rotate about the second axis 30' within the bore 30. This allows the shuttle bearing to maintain good contact with the piston in the case of slight misalignment of any of the components in the power transfer assembly. The power transfer assembly is therefore more tolerant of manufacturing errors such as misalignment of axes including the axes of the output shaft 5 and/or the cylinder bore 6 and/or the bore 30 through the piston and/or the bore 34 through the shuttle bearing. These axes may therefore be machined slightly offset without hindering the durability and function of the engine.

In order to permit assembly of the output shaft, shuttle bearing and piston, at least one of the output shaft and/or the piston may be provided as a split component. FIGS. 1 to 7 do not show a split for reasons of clarity, but it will be appreciated by the skilled person that a piston assembly functioning as described above could be assembled in many different ways. For example, if the eccentric portion of the output shaft is too large to pass through the slot in the piston (as shown in FIGS. 1 to 7), the piston may be a split component which is assembled around the output shaft and shuttle bearing, or the shaft may be a split component which is assembled inside the shuttle bearing and piston. Alternatively the slot may be sufficiently large to receive the eccentric portion of the output shaft, thereby permitting assembly of a non-split piston and a non-split output shaft.

Figure 10:
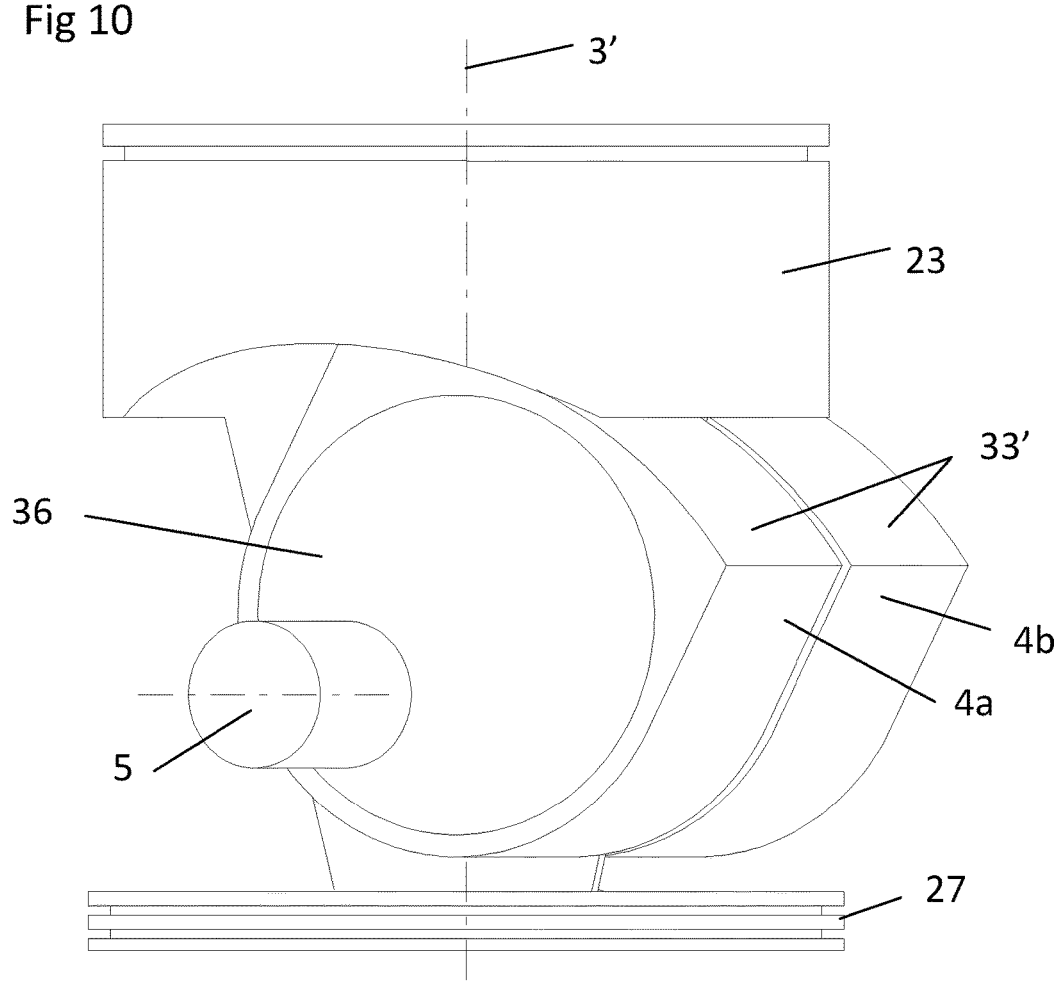

In an alternative embodiment shown in FIGS. 9 and 10 (in which the same reference numerals have been used for equivalent components) two shuttle bearings 4a, 4b have a non-planar bearing surfaces 33' allowing rotation of the shuttle bearings about the third axis (that is the axis of the bore through each shuttle bearing extending perpendicular to the piston axis 3' and perpendicular to the direction of motion of the shuttle bearings). The interfaces between the shuttle bearings and the piston appear part cylindrical when viewed in the direction of the axis of the output shaft 5. By providing non-planar bearing surfaces allowing rotation of the shuttle bearings about the third axis the piston displacement may be further controlled. For example, piston acceleration about TDC is further reduced by the rotation of the shuttle bearings, thereby further decreasing peak loading and further increasing TDC dwell time, as indicated in FIG. 7.

In the embodiment of FIGS. 9 and 10 the shuttle bearings each have only one bearing surface 33' in contact with the reverse face of the working head 23. In this case positive contact between the piston and the shuttle bearings may be maintained by a combination of positive pressure in the combustion chamber and the action of the eccentric portions of the shaft. In some embodiments the shuttle bearings may be coupled to the working head by interlocking engaging means, for example a "T" shaped or "L" shaped protrusion within a corresponding recess in the working head 23. The interlocking engaging means may increase the maximum engine speed achievable by the engine before the shuttle bearings begin to break contact with the reverse face of the working head 23 as the piston 3 passes TDC. In other embodiments the shuttle bearing may include a second curved bearing surface at its lower edge engaging a corresponding bearing surface on the reverse face of the lower piston head 27 which also allows rotation as described above.

In the embodiment of FIGS. 9 and 10 the power transfer assembly includes first and second shuttle bearings 4a and 4b mounted to a common output shaft 5 on eccentric portions 36. The first and second shuttle bearings are located either side of two linking elements 29 jointing the working head 23 to the supercharging head 27. The linking elements are separated by a slot which receives the shaft. In an alternative embodiment an engine may have only a single shuttle bearing adapted to rotate about the third axis.

Figure 11:
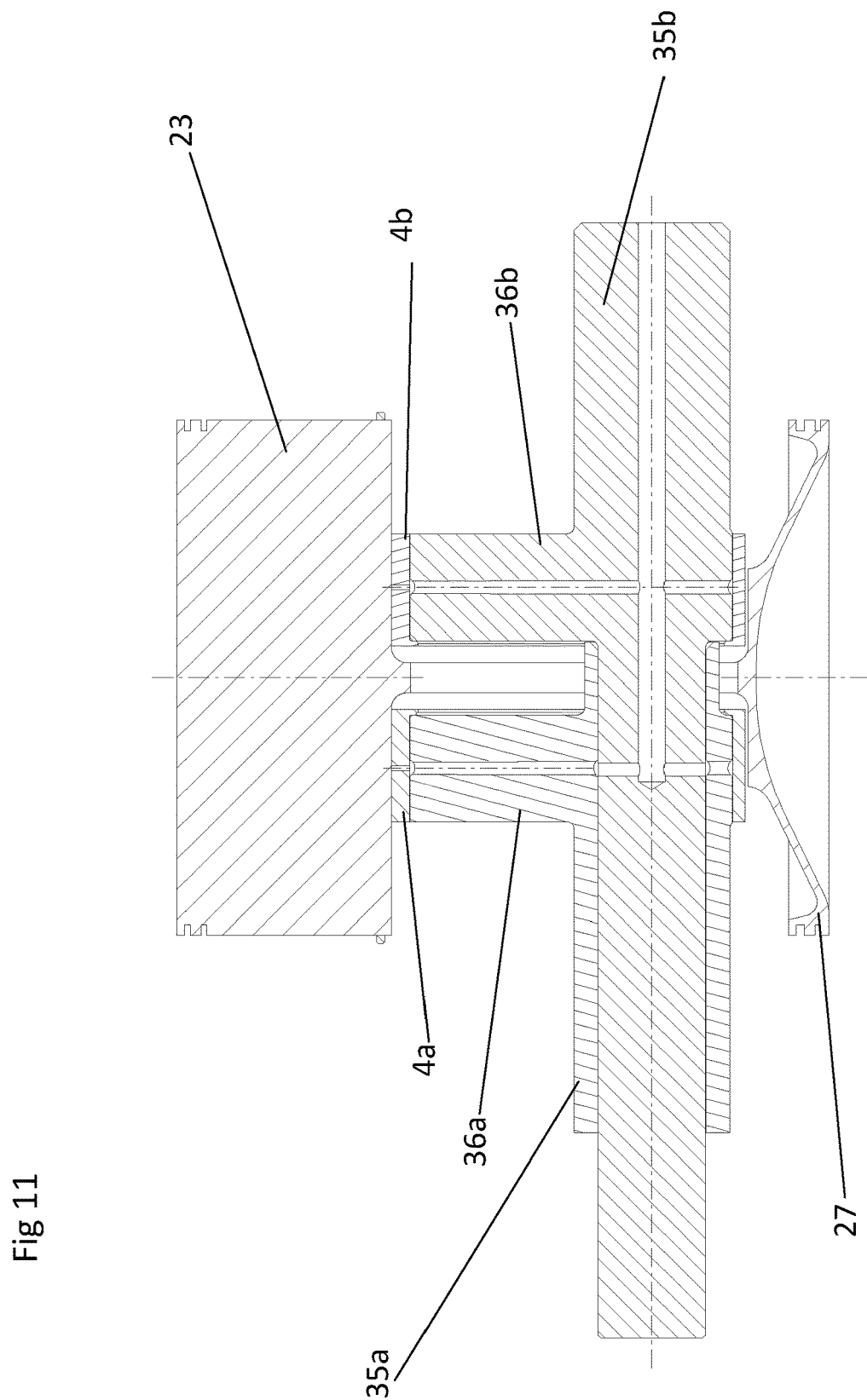
FIG. 11 shows an engine according to another alternative embodiment of the invention.

In a further alternative embodiment shown in FIG. 11 two shuttle bearings may be operated out of phase with each other. The embodiment of FIG. 11 is similar to that shown in FIGS. 9 and 10, except the two shuttle bearings 4a and 4b are respectively mounted on concentric, counter-rotating shafts 35a and 35b, each shaft having an eccentric portion 36a, 36b to engage its respective shuttle bearing. By operating the first and second shuttle bearings 4a,4b 180 degrees out of phase with each other, the reciprocating motion of each shuttle bearing in the lateral direction is balanced by the movement of the other shuttle bearing. Therefore the engine is substantially laterally self-balanced and engine vibration is reduced.

In an alternative embodiment the shuttle bearing may have one or more part-spherical bearing surfaces allowing rotation about both an axis parallel to the direction of motion of the shuttle bearing(s) relative to the piston and an axis perpendicular to the piston axis and perpendicular to the direction of movement of the shuttle bearing(s) relative to the piston. This gives the combined advantage of increased tolerance of misalignment and wear of components and also increased TDC dwell time.

Although the invention has been described above with reference to one or more preferred embodiments, it will be appreciated that various changes or modifications may be made without departing from the scope of the invention as defined in the appended claims. One or more of the features of any of the above embodiments may be combined with one or more of the features of any other embodiment.

The invention claimed is:

1. A piston arrangement comprising: a piston, a first chamber, a second chamber and a power transfer assembly; wherein the piston comprises a first head movable within the first chamber and a second head movable within the second chamber; wherein, in operation, the piston follows a linear path in reciprocating motion along a first axis; wherein the power transfer assembly comprises a shaft rotatably coupled to a shuttle bearing and arranged to convert the reciprocating motion of the piston to rotary motion of the shaft; wherein the shuttle bearing moves relative to the piston in reciprocating motion along a second axis substantially transverse to the first axis, and wherein the first chamber has the same diameter as the second chamber, and the first head has a different outer diameter to that of the second head.

2. A piston arrangement according to claim 1, wherein the shuttle bearing comprises one or more convex bearing surfaces.

3. A piston arrangement according to claim 2, wherein the piston comprises one or more concave bearing surfaces corresponding to the one or more convex bearing surfaces of the shuttle bearing.

4. A piston arrangement according to claim 1, wherein an interface between the piston and the shuttle bearing appears circular or part circular when viewed in the direction of the second axis.

5. A piston arrangement according to claim 1, wherein an interface between the piston and the shuttle bearing is cylindrical or part cylindrical or spherical or part spherical.

6. A piston arrangement according to claim 1, wherein the piston comprises a bore extending through its thickness in a direction substantially parallel to the second axis, and wherein the shuttle bearing is received in the bore.

7. A piston arrangement according to claim 1, wherein the piston comprises a slot extending through its thickness in a direction substantially perpendicular to the second axis, and wherein the shaft is received in the slot.

8. A piston arrangement according to claim 1, wherein the shuttle hearing substantially cylindrical or part-cylindrical and has a longitudinal axis parallel to the second axis.

9. A piston arrangement according to claim 1, wherein at least one bearing surface of the piston and/or shuttle bearing comprises one or more grooves formed in the bearing surface.

10. A piston arrangement according to claim 1, wherein the shaft is rotatably coupled to the shuttle bearing at an eccentric portion of the shaft.

11. A piston arrangement according to claim 1, wherein the second head is rigidly held in fixed relation to the first head.

12. A piston arrangement according to claim 1, wherein the second head is integrally formed with the first head.

13. A piston arrangement according to claim 1, wherein the first head and the second head face away from each other in, opposite directions.

14. A piston arrangement according to claim 1, wherein the first head and the second head are both centred on the first axis and each move in reciprocating motion along, the first axis.

15. A piston arrangement according to claim 1, wherein the shuttle bearing directly or indirectly engages the piston.

16. A piston arrangement according to claim 1, wherein the shuttle hearing contacts a reverse face of the first and/or the second piston head.

17. An internal combustion engine comprising a piston arrangement according to claim 1, wherein the first chamber is a combustion chamber.

18. An internal combustion engine according to claim 17, wherein the internal combustion engine is a two-stroke or four-stroke engine.

19. An internal combustion engine according to claim 17, wherein the second chamber is a supercharging chamber arranged to supply inlet air to the combustion chamber.

20. An internal combustion engine according to claim 19, further comprising a transfer port extending between the supercharging chamber and the combustion chamber, wherein the transfer port has an outlet at the combustion chamber which is opened and closed by the reciprocating motion of the first head.

21. An internal combustion engine according to claim 20, further comprising an oil seal mounted to a cylinder wall of the first chamber.

22. An internal combustion engine according to claim 21, wherein the oil seal is mounted to the cylinder wall on the opposite side of the transfer port to the combustion chamber.

23. An internal combustion engine according to claim 22, wherein the first head comprises an extended piston skirt which remains in continuous contact with the oil seal during reciprocating movement of the piston.

24. An internal combustion engine according to claim 20, further comprising a gas seal mounted to the first head.

25. An internal combustion engine according to claim 24, wherein the gas seal is positioned such that it passes the outlet of the transfer port during operation of the engine.

26. An internal combustion engine according to claim 17, wherein the power transfer assembly is housed within an intermediate chamber located between the first, and second chambers.

27. An internal combustion engine according to claim 26, wherein the intermediate chamber is sealed to substantially prevent the passage of fluid past the first and/or second head into or out of the first and/or second chambers.

28. A piston arrangement according to claim 1, wherein the shuttle hearing is coupled to the piston via a non-planar bearing surface thereby allowing rotation of the shuttle bearing.

29. A piston arrangement according to claim 28, wherein the non-planar bearing surface is arranged to allow rotation of the shuttle bearing about the second axis and/or about a third axis which is substantially transverse to the first and second axes.

* * * * *

UNITED STATES PATENT AND TRADEMARK OFFICE
CERTIFICATE OF CORRECTION

PATENT NO.         : 10,240,559 B2
APPLICATION NO.    : 15/414999
DATED              : March 26, 2019
INVENTOR(S)        : Oliver Jukes It is certified that error appears in the above-identified patent and that said Letters Patent is hereby corrected as shown below:

In the Claims

In Column 14, Line 34, delete "hearing" and substitute therefor --bearing--.

Signed and Sealed this
Fourteenth Day of May, 2019

Andrei Iancu
*Director of the United States Patent and Trademark Office*